(12) United States Patent
Barth

(10) Patent No.: US 12,479,079 B2
(45) Date of Patent: Nov. 25, 2025

(54) ELECTRONIC APPARATUS AND MACHINE TOOL HAVING SAID ELECTRONIC APPARATUS

(71) Applicant: Robert Bosch GmbH, Stuttgart (DE)

(72) Inventor: Daniel Barth, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 580 days.

(21) Appl. No.: 17/788,472

(22) PCT Filed: Nov. 26, 2020

(86) PCT No.: PCT/EP2020/083452
§ 371 (c)(1),
(2) Date: Jun. 23, 2022

(87) PCT Pub. No.: WO2021/136619
PCT Pub. Date: Jul. 8, 2021

(65) Prior Publication Data
US 2023/0031201 A1  Feb. 2, 2023

(30) Foreign Application Priority Data

Dec. 30, 2019  (DE) .................... 10 2019 220 624.7
Nov. 25, 2020  (DE) .................... 10 2020 214 816.3

(51) Int. Cl.
*B25F 5/00* (2006.01)
*B24B 23/02* (2006.01)
*H02K 9/06* (2006.01)

(52) U.S. Cl.
CPC ............ *B25F 5/008* (2013.01); *B24B 23/028* (2013.01); *H02K 9/06* (2013.01)

(58) Field of Classification Search
CPC .. H02K 1/20; H02K 1/32; H02K 5/20; H02K 5/203; H02K 7/14; H02K 9/00;
(Continued)

(56) References Cited

U.S. PATENT DOCUMENTS 4,739,204 A * 4/1988 Kitamura ............... H02K 9/197
                                                              123/41.31
4,818,906 A * 4/1989 Kitamura ............... H02K 9/197
                                                              310/58
(Continued)

FOREIGN PATENT DOCUMENTS

CN      104302450 A     1/2015
CN      110340855 A    10/2019
(Continued)

OTHER PUBLICATIONS

International Search Report corresponding to International Patent Application No. PCT/EP2020/083452, mailed Mar. 17, 2021 (7 pages).

*Primary Examiner* — Ahmed Elnakib
(74) *Attorney, Agent, or Firm* — Maginot, Moore & Beck LLP

(57) ABSTRACT

The disclosure relates to an electronic apparatus for a machine tool, having at least one electronic unit and having at least one fluid cooling unit for cooling the electronic unit using a fluid. According to the disclosure, the electronic unit is arranged at least primarily, in particular completely, outside of a fluid flow path of the fluid cooling unit.

16 Claims, 11 Drawing Sheets

(58) Field of Classification Search
CPC ... H02K 9/10; H02K 9/06; H02K 9/19; B25F 5/008; B24B 23/028
USPC .............................................. 310/62, 47, 52
See application file for complete search history.

(56) References Cited

U.S. PATENT DOCUMENTS

| | | | | |
|---|---|---|---|---|
| 5,491,370 | A * | 2/1996 | Schneider | H02K 11/33 310/68 R |
| 5,836,270 | A * | 11/1998 | Aoki | F01P 3/20 123/41.31 |
| 6,198,183 | B1 * | 3/2001 | Baeumel | H02K 5/225 310/52 |
| 7,911,090 | B2 * | 3/2011 | Schoen | H02K 1/20 310/216.096 |
| 2010/0117466 | A1 * | 5/2010 | Gas | H02K 11/05 310/68 D |
| 2013/0049495 | A1 | 2/2013 | Matsuo | |
| 2014/0265664 | A1 | 9/2014 | Camilleri et al. | |
| 2015/0199376 | A1 * | 7/2015 | Matsuo | G06F 16/13 707/626 |
| 2019/0305640 | A1 * | 10/2019 | Duernegger | H02K 9/06 |
| 2023/0001261 | A1 * | 1/2023 | Kang | A63B 21/4037 |
| 2023/0031201 | A1 * | 2/2023 | Barth | B24B 23/028 |

FOREIGN PATENT DOCUMENTS

| | | |
|---|---|---|
| CN | 110446387 A | 11/2019 |
| DE | 196 08 677 A1 | 9/1997 |
| DE | 10 2005 007 546 A1 | 8/2006 |
| DE | 10 2007 000 290 A1 | 11/2008 |
| DE | 10 2008 060 703 A1 | 6/2009 |
| DE | 10 2009 015 422 A1 | 10/2009 |
| DE | 10 2013 202 672 A1 | 8/2014 |
| DE | 10 2013 206 953 A1 | 11/2014 |
| DE | 10 2015 111 717 A1 | 1/2017 |
| DE | 10 2016 210 853 A1 | 12/2017 |
| DE | 20 2019 102 569 U1 | 8/2019 |
| EP | 1 398 865 A2 | 3/2004 |
| EP | 3 549 717 A1 | 10/2019 |
| WO | 2019/130981 A1 | 7/2019 |

* cited by examiner

ELECTRONIC APPARATUS AND MACHINE TOOL HAVING SAID ELECTRONIC APPARATUS

This application is a 35 U.S.C. § 371 National Stage Application of PCT/EP2020/083452, filed on Nov. 26, 2020, which claims the benefit of priority to Serial Nos. DE 10 2019 220 624.7, filed on Dec. 30, 2019, and DE 10 2020 214 816.3, filed on Nov. 25, 2020, both filed in Germany, the disclosures of which are incorporated herein by reference in their entirety.

BACKGROUND

An electronic device for a power tool, comprising at least one electronic unit, and comprising at least one fluid cooling unit for cooling the electronic unit by means of a fluid, has already been proposed.

SUMMARY

The disclosure is based on an electronic device for a power tool, comprising at least one electronic unit, and comprising at least one fluid cooling unit for cooling the electronic unit by means of a fluid.

It is proposed that the electronic unit be arranged at least largely, in particular entirely, outside of a fluid flow path of the fluid cooling unit.

Preferably, the fluid cooling unit comprises at least one channel element, in particular the fluid flow path, in particular in a region in which the electronic unit is arranged, running at least largely through the channel element. A "fluid flow path" is to be understood to mean, in particular, a simulated, or calculated, or measured flow course of the fluid through the fluid cooling unit, in particular at least 92%, preferably at least 95%, and particularly preferably at least 98% of all particles of the fluid moving within the flow course. In particular, the fluid flow path is realized as a set of, in particular at least 92%, preferably at least 95% and particularly preferably at least 98% of, all possible flow paths of the particles of the fluid or fluid stream. Preferably, the fluid flow path extends from at least one intake opening of the fluid cooling unit to at least one outlet opening of the fluid cooling unit. The fluid cooling unit has a guide section along which the fluid flow path is realized. In particular, the guide section is realized along a direction of main extent of the fluid flow path. A "direction of main extent" of an object, in particular of the fluid flow path, is to be understood to mean, in particular, a direction that is parallel to a longest edge of a smallest geometric cuboid that only just completely encloses the object. Preferably, the electronic unit is at least largely, in particular entirely, arranged outside of a flow recess enclosed by the fluid cooling unit for conducting the fluid, or fluid stream. Particularly preferably, the fluid flow unit is realized and/or the electronic unit is arranged in such a manner that the electronic unit, in particular via a channel element of the fluid cooling unit, is arranged at a distance from the fluid flow path and/or the flow recess enclosed by the fluid cooling unit.

Preferably, the intake opening is delimited by a housing unit of the power tool. In particular, the intake opening is arranged on a side of the housing unit that faces away from a working region of the power tool. Preferably, the outlet opening is at least partially delimited by the housing unit and is preferably arranged at a distance from the intake opening. Preferably, the fluid cooling unit is designed to conduct the fluid through the housing unit via a fluid stream. "Designed" is to be understood to mean, in particular, specially programmed, specially configured and/or specially equipped. That an object, in particular the fluid cooling unit, is designed for a particular function, in particular to conduct the fluid through the housing unit via a fluid stream, is to be understood to mean, in particular, that the object fulfils and/or executes this particular function in at least one application state and/or operating state. Preferably, the fluid cooling unit is designed to conduct the fluid stream via the intake opening, through at least one channel element, past the electronic unit and/or a drive unit of the power tool to the outlet opening. In particular, the at least one channel element is arranged at least substantially entirely within the housing unit. "Substantially entirely" is to be understood to mean, in particular, an indication of a proportion of a component, in particular of the channel element, that has a particular property, in particular of being enclosed by the housing unit, in particular at least 90%, preferably at least 95% and particularly preferably at least 98% of a total volume and/or of a total mass of the component having the property. Preferably, the power tool is realized as a hand-held power tool. For example, the power tool is realized as an angle grinder, a drill, a vacuum cleaner, a screwdriver or the like. In particular, the drive unit is realized as a motor, especially an electric motor. Preferably, the drive unit, the electronic unit and/or the fluid cooling unit, in particular with the exception of the intake opening and/or the outlet opening, are/is arranged at least substantially entirely within the housing unit. Preferably, the electronic unit is designed at least to control and/or supply the drive unit. An "electronic unit" is to be understood to mean, in particular, a unit comprising a processor unit and comprising a memory unit, and comprising an operating program stored in the memory unit. It is also conceivable for the electronic unit to be designed to control and/or supply other components of the power tool such as, for example, display elements, interfaces or the like. Particularly preferably, the drive unit is realized as a brushless AC or DC motor, in particular the electronic unit, being designed, in particular additionally, to commutate the drive unit. Preferably, the electronic unit comprises at least one printed circuit board, on which in particular the processor unit and/or the memory unit are/is arranged.

The design of the electronic device according to the disclosure can advantageously prevent the electronic unit cooled by the fluid from being contaminated by foreign bodies in the fluid. Unwanted contact faults and/or short circuits within the electronic unit can advantageously be prevented. An advantageously long service life of the electronic unit can be achieved. It becomes advantageously possible to achieve fault-free operation of the power tool in areas where there is a high level of dirt and/or generated dust.

It is furthermore proposed that the fluid cooling unit comprise at least one fluid cooling element against which the electronic unit bears, at least partially. Advantageously effective cooling of the electronic unit becomes possible, in particular because a large amount of heat from the electronic unit can be dissipated to the fluid cooling element via a form fit. Preferably, the electronic unit comprises at least one heat diffusion element for dissipating heat. Preferably, the heat diffusion element is designed to collect in particular heat generated during operation of the electronic unit and/or to transfer it to the fluid cooling element. Preferably, the electronic unit, in particular the heat diffusion element, has at least one support surface. In particular, the electronic unit, in particular the heat diffusion element, bears against the fluid cooling element via the support surface. Preferably, the heat diffusion element is made at least partially, in particular at least largely, of a material having a thermal conductivity of at least 10 W/(m·K), preferably at least 50 W/(m·K), more preferably at least 100 W/(m·K), particularly preferably at least 200 W/(m·K), and very particularly preferably at least 400 W/(m·K). Preferably, the heat diffusion element is arranged on the printed circuit board. In particular, the heat diffusion element is realized as a heat sink, for example as a copper structure or the like. Preferably, the support surface is a flat surface. It is also conceivable, however, for the support surface to be at least partially curved.

It is also proposed that the fluid cooling element be realized as a channel element for conducting the fluid, wherein the electronic unit bears at least partially against an outer wall of the fluid cooling element. Advantageously effective indirect cooling of the electronic unit by the fluid becomes possible, advantageously enabling a large amount of heat from the electronic unit to be dissipated to the fluid cooling element, in particular via a form fit. Preferably, the support surface bears against the outer wall of the fluid cooling element. Preferably, the heat diffusion element bears with full surface contact against the fluid cooling element via a side on which the support surface is arranged. Preferably, a channel element, in particular the fluid cooling element realized as a channel element, delimits at least one fluid channel in which the fluid is conducted. For example, the fluid cooling element is realized in such a manner that the fluid channel has a cylindrical, cubic and/or N-cornered shape.

It is further proposed that the fluid cooling element delimit at least one fluid channel, for conducting the fluid, that has an at least substantially round cross-sectional area. An advantageous laminar flow of the fluid within the fluid cooling element becomes possible. An advantageously rapid dissipation of heat from the electronic unit through the fluid cooling element thus becomes possible. Preferably, the cross-sectional area of the fluid cooling element is oriented at least substantially perpendicularly to a central axis and/or a direction of main extent of the fluid cooling element. "Substantially perpendicularly" is to be understood to mean, in particular, an orientation of a direction, in particular a direction along the cross-sectional area, relative to a reference direction, in particular a direction along the central axis and/or the direction of main extent of the fluid cooling element, the direction and the reference direction, in particular as viewed in a projection plane, enclosing an angle of 90°, and the angle having a maximum deviation of in particular less than 8°, advantageously less than 5° and particularly advantageously less than 2°. Preferably, the cross-sectional area of the fluid channel is oriented at least substantially perpendicularly to the support surface and/or to the outer wall of the fluid cooling element. Particularly preferably, the cross-sectional area of the fluid channel has a contour that is at least substantially circular or elliptical. Preferably, the cross-sectional area of the fluid channel is oriented at least substantially perpendicularly to a direction of conduction of the fluid through the fluid cooling element. Preferably, a maximum value of the cross-sectional area of the fluid channel delimited by the fluid cooling element is at least 100 mm$^2$, preferably at least 200 mm$^2$, preferably at least 400 mm$^2$ and particularly preferably at least 600 mm$^2$.

It is furthermore proposed that the fluid cooling element have, on the outer wall, at least one contact surface that at least substantially corresponds to a support surface, in particular the aforementioned, of the electronic unit, wherein the electronic unit bears against the contact surface of the fluid cooling element via the support surface. An advantageously large surface for heat transfer from the electronic unit to the fluid cooling element becomes possible. Advantageously effective cooling of the electronic unit can be achieved. Preferably, the contact surface and the support surface are realized as flat surfaces. It is also conceivable, however, for the contact surface and the support surface to be realized as at least partially curved surfaces. For example, it is conceivable for the electronic unit to at least partially, in particular at least largely, enclose the fluid cooling element. Preferably, the contact surface and/or the support surface have/has a maximum area of at least 100 mm$^2$, preferably at least 200 mm$^2$, more preferably at least 400 mm$^2$ and particularly preferably at least 600 mm$^2$. Preferably, the contact surface and/or the support surface have/has a maximum area of at most 5000 mm$^2$, preferably at most 3000 mm$^2$ and particularly preferably at most 2000 mm$^2$.

It is also proposed that the fluid cooling element be at least partially, in particular at least in a region against which the electronic unit bears, made of a material having a thermal conductivity of at least 10 W/(m·K), preferably at least 50 W/(m·K), preferably at least 100 W/(m·K), particularly preferably at least 200 W/(m·K) and very particularly preferably at least 400 W/(m·K). An advantageously effective, or rapid, dissipation of heat from the electronic unit via the fluid cooling element becomes possible. An advantageously effective cooling of the electronic unit can be achieved. Unwanted damage due to development of heat on the electronic unit and/or the fluid cooling element can advantageously be prevented. Preferably, the fluid cooling element is made, at least substantially entirely, of a material having a thermal conductivity of at least 10 W/(m·K), preferably at least 50 W/(m·K), more preferably at least 100 W/(m·K), particularly preferably at least 200 W/(m·K), and very particularly preferably at least 400 W/(m·K).

Preferably, the fluid cooling element is made of a metallic material, in particular aluminum. It is conceivable for the fluid cooling element, only in a region within which the electronic unit bears against the fluid cooling element, to be made of a material having a thermal conductivity of at least 10 W/(m·K), preferably at least 50 W/(m·K), more preferably at least 100 W/(m·K), particularly preferably at least 200 W/(m·K), and very particularly preferably at least 400 W/(m·K).

It is further proposed that the fluid cooling unit comprise at least one fluid cooling element, wherein the fluid flow path, at least in proximity to the electronic unit, extends at least substantially entirely within the fluid cooling element. An advantageously compact design of the power tool, in particular of the fluid cooling unit becomes possible. An advantageously effective cooling of the electronic unit can be achieved, in particular since an entire volume of a drawn-in fluid can be used for cooling the electronic unit by means of the fluid cooling element. In particular, the fluid cooling element is designed, in particular in the proximity of the electronic unit, to conduct an entire fluid stream, that in particular flows via the intake opening into the fluid cooling unit. Preferably, the fluid flow path, in particular in the proximity of the electronic unit, runs at least substantially entirely through the fluid cooling element, in particular the fluid channel. Alternatively, it is conceivable for the fluid cooling element to delimit at least, in particular exactly, two fluid channels, the fluid flow path, in particular in the proximity of the electronic unit, running at least substantially entirely through the fluid cooling element, in particular the fluid channels. The proximity of the electronic unit extends in particular along a direction of main extent of the fluid cooling unit, in particular of the fluid cooling element, at least over an entire length of the electronic unit.

It is furthermore proposed that the electronic device comprise at least one sealing unit designed to close the electronic unit, together with the fluid cooling unit, at least partially, in particular with respect to the fluid flow path, at least substantially in an airtight and/or watertight manner. An advantageously high level of protection of the electronic unit against contamination and/or abrasion by foreign bodies contained in the fluid becomes possible. An advantageously high proportion of the heat of the electronic unit can be dissipated via the fluid cooling element. Thus, an unwanted development of heat in a region around the electronic unit can be advantageously prevented. Preferably, the sealing unit has at least one sealing element. It is conceivable for the sealing element to be made at least partially, in particular at least largely, of a thermally conductive material having, in particular, a thermal conductivity of at least 10 W/(m·K), preferably at least 50 W/(m·K), more preferably at least 100 W/(m·K), particularly preferably at least 200 W/(m·K) and very particularly preferably at least 400 W/(m·K). Alternatively, it is conceivable for the sealing element to be made of a thermally insulating material such as, for example rubber or the like.

Preferably, the sealing element bears at least partially against the fluid cooling unit, in particular the fluid cooling element, and/or the heat diffusion element. In particular, the sealing element encloses the electronic unit, together with the fluid cooling element and/or the heat diffusion element, at least substantially entirely. It is conceivable for a volume enclosed between the sealing element and the electronic unit, or the fluid cooling element and/or the heat diffusion element, to be filled with or evacuated by a thermally insulating gas.

In particular, the evacuated volume has a maximum pressure of in particular less than 1000 mbar, preferably less than 300 mbar, more preferably less than 1 mbar and particularly preferably less than $10^{-2}$ mbar. In particular, in a design in which the sealing element is made of a thermally insulating material, the sealing element preferably bears flatly against the electronic unit.

Additionally proposed is a power tool, in particular a hand-held power tool, comprising at least one electronic device according to the disclosure.

The design of the power tool according to the disclosure can advantageously prevent the electronic unit cooled by the fluid and/or components within the housing unit from being contaminated by foreign bodies in the fluid. Unwanted contact faults and/or short circuits within the electronic unit can be advantageously prevented. An advantageously long service life of the power tool can be achieved. It becomes advantageously possible to achieve fault-free operation of the power tool in areas where there is a high level of dirt and/or generated dust.

It is also proposed that the power tool comprise at least one drive unit, wherein the fluid cooling unit is designed to cool the drive unit. An advantageously compact design of the power tool becomes possible. Preferably, the drive unit is arranged, in particular fluidically, behind the electronic unit and/or the fluid cooling element, as viewed from the intake opening. It is conceivable for the power tool to comprise a separating unit for dividing the fluid stream into at least two sub-streams in dependence on a foreign body density. In particular, the separating unit is arranged, in particular fluidically, behind the electronic unit and/or the fluid cooling element and in front of the drive unit, as viewed from the intake opening.

The electronic device according to the disclosure and/or the power tool according to the disclosure are/is not intended in this case to be limited to the application and embodiment described above. In particular, the electronic device according to the disclosure and/or the power tool according to the disclosure may have a number of individual elements, components and units that differs from a number stated herein, in order to fulfill an operating principle described herein. Moreover, in the case of the value ranges specified in this disclosure, values lying within the stated limits are also to be deemed as disclosed and applicable in any manner.

BRIEF DESCRIPTION OF THE DRAWINGS

Further advantages are given by the following description of the drawings. Six exemplary embodiments of the disclosure are represented in the drawings. The drawings, the description and the disclosure contain numerous features in combination. Persons skilled in the art will also expediently consider the features individually and combine them to create appropriate further combinations.

In the drawings.

DETAILED DESCRIPTION

Figure 1:
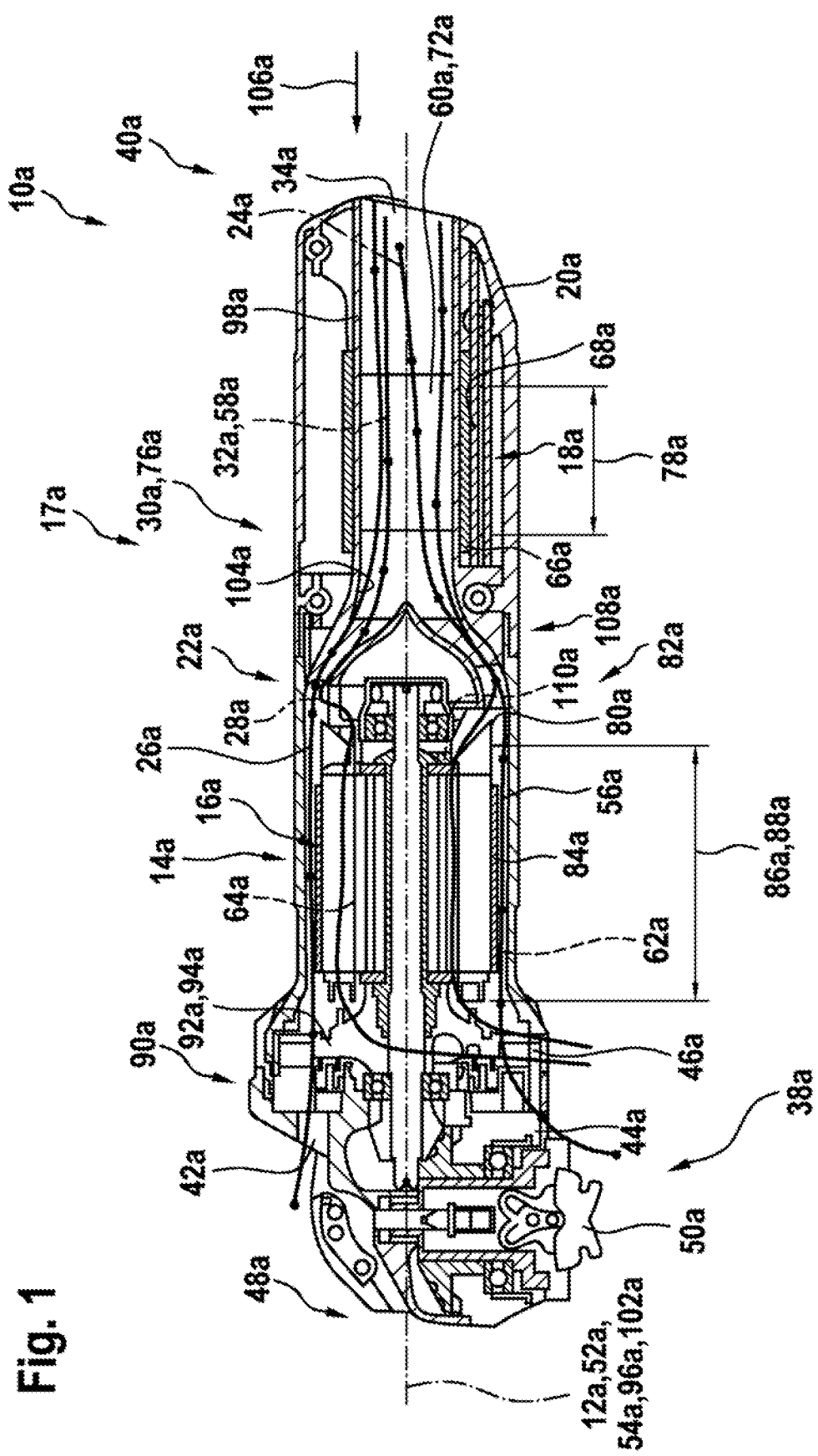
FIG. 1 shows a side view of a longitudinal section of a power tool according to the disclosure with an electronic device and a fluid cooling unit.

FIG. 1 shows a side view of a power tool 10a, the power tool 10a being in section along a plane through a longitudinal axis 12a of the power tool 10a. The power tool 10a is realized as a hand-held power tool. The power tool 10a is realized as an electric power tool. The power tool 10a is realized as an angle grinder. However, other designs of the power tool 10a are also conceivable, for example as a drill, as a screwdriver, as a hammer, as a vacuum cleaner or the like. The power tool 10a has a housing unit 14a. The power tool 10a has a drive unit 16a, which is arranged within the housing unit 14a and which in particular in realized as a brushless DC motor. However, other designs of the drive unit 16a are also conceivable, for example as a universal motor. The power tool 10a comprises an electronic device 17a. The power tool 10a has an electronic unit 18a, which is designed at least to control and supply electricity to the drive unit 16a, and in particular is realized as part of the electronic device 17a. It is also conceivable for the electronic unit 18a to be designed to control and/or supply other components of the power tool 10a such as, for example, display elements, interfaces or the like. The electronic unit 18a is designed to commutate the drive unit 16a. The electronic unit 18a comprises a printed circuit board 20a, arranged on which in particular are a processor unit and a memory unit that in particular are not shown in FIG. 1. The power tool 10a has a separating unit 22a, which is designed to divide at least one fluid stream 24a conducted through the housing unit 14a, in particular in dependence on a foreign body density, into at least two sub-streams 26a, 28a, one sub-stream 26a of the sub-streams 26a, 28a having a higher foreign body density in comparison with another sub-stream 28a of the sub-streams 26a, 28a. The power tool 10a has a fluid cooling unit 30a that is designed to cool the drive unit 16a by means of the at least two sub-streams 26a, 28a. The fluid cooling unit 30a is realized as part of the electronic device 17a. The fluid cooling unit 30a is designed to cool the electronic unit 18a by means of a fluid, or fluid stream 24a. The electronic unit 18a is arranged at least largely, in particular entirely, outside of a fluid flow path 32a of the fluid cooling unit 30a. The fluid cooling unit 30a is designed to cool the drive unit 16a and the electronic unit 18a. The fluid cooling unit 30a is designed to conduct the fluid, or fluid stream 24a, through the housing unit 14a.

The fluid cooling unit 30a comprises an intake opening 34a for drawing in the fluid, or fluid stream 24a. The intake opening 34a is delimited by the housing unit 14a and arranged on a side of the power tool 10a, in particular of the housing unit 14a, that faces away from a working region 38a of the power tool 10a. The intake opening 34a is realized along the longitudinal axis 12a of the power tool 10a, in particular at an end region 40a of the power tool 10a that is realized along the longitudinal axis 12a of the power tool 10a and that at least partially faces away from the working region 38a. The fluid cooling unit 30a comprises a multiplicity of outlet openings 42a, 44a, 46a for draining the fluid or the fluid stream 24a from the power tool 10a. The outlet openings 42a, 44a, 46a are arranged in an end region 48a of the power tool 10a that faces away from the intake opening 34a. The outlet openings 42a, 44a, 46a are arranged in a region around a tool holder 50a of the power tool 10a. One outlet opening 42a of the multiplicity of outlet openings 42a, 44a, 46a is arranged on a side of the power tool 10a, in particular of the housing unit 14a, that faces away from the working region 38a. Two outlet openings 44a, 46a of the multiplicity of outlet openings 42a, 44a, 46a are arranged on a side of the power tool 10a, in particular of the housing unit 14a, that faces toward the working region 38a. One outlet opening 44a of the two outlet openings 44a, 46a is designed to divert the sub-stream 26a. Another outlet opening 46a of the two outlet openings 44a, 46a is designed to divert the other sub-stream 28a.

The drive unit 16a has a drive axis 52a around which a rotor of the drive unit 16a is driven. The drive axis 52a of the drive unit 16a is oriented at least substantially parallel to the longitudinal axis 12a of the power tool 10a. The drive axis 52a of the drive unit 16a is oriented coaxially with a direction of main extent 54a of the fluid cooling unit 30a. The fluid cooling unit 30a comprises a channel element, in particular a fluid cooling element 66a, the fluid flow path 32a, in particular in a region in which the electronic unit 18a is arranged, running at least largely through the channel element. The fluid flow path 32a extends from the intake opening 34a of the fluid cooling unit 30a to the outlet openings 42a, 44a, 46a of the fluid cooling unit 30a. The fluid cooling unit 30a has a guide section 58a along which the fluid flow path 32a is realized. In particular, the guide section 58a is realized along a direction of main extent 54a of the fluid flow path 32a. The electronic unit 18a is arranged at least largely, in particular entirely, outside of a flow recess 60a, enclosed by the fluid cooling unit 30a, for conducting the fluid or, the fluid stream 24a. The fluid cooling unit 30a is realized and/or the electronic unit 18a is arranged in such a manner that the electronic unit 18a, in particular via a channel element, in particular the fluid cooling element 66a, of the fluid cooling unit 30a, is arranged at a distance from the fluid flow path 32a and/or the flow recess 60a enclosed by the fluid cooling unit 30a. The fluid cooling unit 30a is designed to conduct the fluid stream 24a via the intake opening 34a, through the channel element, in particular the fluid cooling element 66a, past the electronic unit 18a and the drive unit 16a to the outlet openings 42a, 44a, 46a. The channel element, in particular the fluid cooling element 66a, is arranged at least substantially entirely within the housing unit 14a. The drive unit 16a, the electronic unit 18a and the fluid cooling unit 30a, in particular with the exception of the intake opening 34a and/or the outlet openings 42a, 44a, 46a, are arranged at least substantially entirely within the housing unit 14a.

The fluid, or fluid stream 24a, drawn in via the intake opening 34a contains a large number of foreign bodies. In particular, the foreign bodies in the fluid stream 24a and/or the sub-streams 26a, 28a are dust particles, residues from a machined workpiece, such as, for example metal chips, impurities in the fluid stream 24a or the like. The fluid, or fluid stream 24a, is at least partially, in particular at least largely, composed of air. The fluid cooling unit 30a is realized in such a manner that when the drive unit 16a is cooled by means of the sub-streams 26a, 28a, in particular the sub-stream 26a and the further sub-stream 28a, thermal energy is transferred from the drive unit 16a to the sub-streams 26a, 28a. The fluid cooling unit 30a is designed to conduct the heat transferred to the sub-streams 26a, 28a, in particular the sub-stream 26a and the other sub-stream 28a, respectively, out of the power tool 10a, in particular the housing unit 14a, via the sub-streams 26a, 28a. The fluid cooling unit 30a is designed to conduct the fluid stream 24a via the intake opening 34a through at least one channel element, in particular the fluid cooling element 66a, of the fluid cooling unit to the separating unit 22a. The separating unit 22a and the fluid cooling unit 30a constitute a single piece, in particular the channel element, in particular the fluid cooling element 66a, of the fluid cooling unit 30a being designed to delimit the fluid stream 24a on the guide section 58a and/or on guide sub-sections 62a, 64a of the sub-stream 28a and the other sub-stream 28a, respectively. The fluid cooling unit 30a is designed to conduct the sub-streams 26a, 28a, after flowing through the separating unit 22a, at least partially in the direction of the drive unit 16a, for the purpose of cooling the drive unit 16a.

The fluid cooling unit 30a comprises the fluid cooling element 66a, against which the electronic unit 18a bears, at least partially. The electronic unit 18a comprises a heat diffusion element 68a for dissipating heat. The heat diffusion element 68a is realized as a copper block and is designed to collect heat generated in particular during operation of the electronic unit 18a and/or to transfer it to the fluid cooling element 66a. The electronic unit 18a, in particular the heat diffusion element 68a, has at least one support surface 70a (see FIG. 4). The electronic unit 18a, in particular the heat diffusion element 68a, bears against the fluid cooling element 66a via the support surface 70a. The heat diffusion element 68a is made of a material having a thermal conductivity of at least 10 W/(m·K), preferably at least 50 W/(m·K), preferably at least 100 W/(m·K), more preferably at least 200 W/(m·K), and most particularly preferably at least 400 W/(m·K). The heat diffusion element 68a is arranged on the printed circuit board 20a. The support surface 70a is realized as a flat surface. It is also conceivable, however, for the support surface 70a to be at least partially curved. The fluid cooling element 66a delimits a fluid channel 72a. The fluid, or fluid stream 24a, is conducted past the electronic unit 18a through the fluid channel 72a, or fluid cooling element 66a. The fluid cooling element 66a is realized in such a manner that the fluid channel 72a has a cylindrical shape. The fluid cooling element 66a is realized as a channel element for conducting the fluid, or fluid stream 24a, the electronic unit 18a bearing at least partially against an outer wall 74a of the fluid cooling element 66a (see FIG. 4). The support surface 70a bears against the outer wall 74a of the fluid cooling element 66a. The heat diffusion element 68a, via a side on which the support surface 70a is arranged, bears with full surface contact against the fluid cooling element 66a. The fluid cooling element 66a, at least in a region against which the electronic unit 18a bears, is made of a material having a thermal conductivity of at least 10 W/(m·K), preferably at least 50 W/(m·K), more preferably at least 100 W/(m·K), particularly preferably at least 200 W/(m·K), and very particularly preferably at least 400 W/(m·K). The fluid cooling element 66a is made of aluminum. It is also conceivable, however, for the fluid cooling element 66a to be made of another thermally conductive, in particular metallic, material.

The fluid flow path 32a extends in proximity 76a to the electronic unit 18a at least substantially entirely within the fluid cooling element 66a. The fluid cooling element 66a is designed, in particular in the proximity of 76a of the electronic unit 18a, to conduct an entire fluid stream 24a that in particular flows via the intake opening 34a into the fluid cooling unit 30a. The fluid flow path 32a runs, in particular in the proximity of 76a of the electronic unit 18a, at least substantially entirely through the fluid cooling element 66a, in particular the fluid channel 72a. Alternatively, it is conceivable for the fluid cooling element 66a to delimit at least, in particular exactly, two fluid channels 72a, the fluid flow path 32a, in particular in the proximity of 76a of the electronic unit 18a, running at least substantially entirely through the fluid cooling element 66a, in particular the fluid channels 72a. The proximity 76a of the electronic unit 18a extends along the direction of main extent 54a of the fluid cooling unit 30a, in particular the of fluid cooling element 66a, at least over an entire length 78a of the electronic unit 18a. The drive unit 16a is arranged, in particular fluidically, behind the electronic unit 18a and the fluid cooling element 66a, as viewed from the intake opening 34a. The separating unit 22a is arranged, in particular fluidically, behind the electronic unit 18a and the fluid cooling element 66a and in front of the drive unit 16a, as viewed from the intake opening 34a.

The separating unit 22a comprises a separating element 80a, realized as a channel element, arranged in proximity 82a to the drive unit 16a and designed to divide the fluid stream 24a. The separating element 80a is designed to conduct the fluid stream 24a on the guide section 58a and to divide it into the sub-stream 26a and the other sub-stream 28a. The separating element 80a is realized as a passive element, in particular the separating element 80a being designed to divide the fluid stream 24a by a shape of the separating element 80a, in particular as the fluid stream 24a flows through it. In particular, the separating element 80a is static, or immobile. In particular, the separating element 80a is described in detail in the description of FIG. 2. The separating unit 22a, in particular the separating element 80a, is realized fluidically between the intake opening 34a and the drive unit 16a. The separating element 80a arranged in proximity 82a to the drive unit 16a is arranged, in particular fastened, directly to the drive unit 16a, in particular to a housing of the drive unit 16a. It is conceivable for the separating element 80a arranged in the proximity 82a of the drive unit 16a to constitute a single piece with the drive unit 16a, in particular the housing of the drive unit 16a.

A channel element 56a of the fluid cooling unit 30a is designed to guide the sub-stream 26a, in particular separately from the other sub-stream 28a, at least partially past an outer wall 84a of the drive unit 16a. It is also conceivable for the fluid cooling unit 30a to comprise a multiplicity of channel elements 56a designed to conduct the sub-stream 26a, in particular the channel elements 56a being arranged, in a distributed manner around the longitudinal axis 12a, around the drive unit 16a. The separating unit 22a and the fluid cooling unit 30a are realized in such a manner that the sub-stream 26a, in particular in a region along the drive unit 16a, is conducted, at least largely separately from the other sub-stream 28a, through the housing unit 14a. The fluid cooling unit 30a is designed to conduct the other sub-stream 28a into, or through, the drive unit 16a for the purpose of cooling the drive unit 16a. The channel element 56a is arranged outside of the drive unit 16a, on the outer wall 84a of the drive unit 16a. The channel element 56a is arranged directly on the drive unit 16a, in particular on the outer wall 84a of the drive unit 16a. The channel element 56a bears flatly against the outer wall 84a of the drive unit 16a. The channel element 56a is designed to transfer heat from the drive unit 16a, in particular the outer wall 84a of the drive unit 16a, to the sub-stream 26a, in particular the drive unit 16a being cooled by the sub-stream 26a. The channel element 56a extends along an entire length 86a of the drive unit 16a, on the outer wall 84a of the drive unit 16a. The channel element 56a is made, at least largely, of a thermally conductive material that, in particular, has a thermal conductivity of, in particular, at least 10 W/(m·K), preferably at least 40 W/(m·K), more preferably at least 100 W/(m·K) and particularly preferably at least 200 W/(m·K). The channel element 56a is at least substantially rectilinear, in particular along an entire length 88a of the outer wall 74a of the drive unit 16a. In particular, the channel element 56a is at least substantially parallel to the outer wall 84a of the drive unit 16a, in particular an outer surface of the outer wall 84a of the drive unit 16a, that faces toward the channel element 56a, or that bears at least partially against the channel element 56a.

The separating unit 22a comprises a conveying unit 90a, which is at least partially arranged within the fluid cooling unit 30a and is designed to convey at least the sub-stream 26a out of or through the housing unit 14a. The conveying unit 90a is realized as a flow pump. The conveying unit 90a is designed to draw in the sub-stream 26a via the fluid cooling unit 30a, in particular through the intake opening 34a. The conveying unit 90a is designed to convey the fluid stream 24a, in particular along the guide section 58a, through the separating unit 22a and to divide it, in particular by means of a conveying speed and the separating element 80a, into the sub-streams 26a, 28a, in particular the sub-stream 26a and the other sub-stream 28a. The conveying unit 90a is designed to convey the sub-streams 26a, 28a, in particular the sub-stream 26a and the other sub-stream 28a, in particular after cooling of the drive unit 16a, through the outlet openings 42a, 44a, 46a out of the power tool 10a, in particular out of the housing unit 14a. The conveying unit 90a comprises a conveying element 92a, which is realized, at least partially, as an axial fan. The conveying element 92a constitutes a single piece with a fan wheel 94a of the drive unit 16a. The conveying element 92a is arranged fluidically behind the drive unit 16a, as viewed from the intake opening 34a. The conveying unit 90a is designed to convey the sub-stream 26a and the other sub-stream 28a separately from each other through the housing unit 14a and/or the fluid cooling unit 30a. The conveying unit 90a, in particular together with the fluid cooling unit 30a, is designed to convey the sub-streams 26a, 28a, in particular downstream of the drive unit 16a, each in different directions that in particular are directed radially outward from a drive axis 96a of the conveying element 92a. The conveying element 92a is arranged, in particular fluidically, behind the drive unit 16a, as viewed from the intake opening 34a. The conveying element 92a is designed to convey the sub-stream 26a, in particular in proximity to the conveying element 92a, in a direction oriented at least substantially parallel to the drive axis 96a of the conveying element 92a. The conveying element 92a is designed to convey the other sub-stream 28a, in particular in proximity to the conveying element 92a, in a direction oriented at least substantially perpendicular to the drive axis 96a of the conveying element 92a. The conveying unit 90a is designed to convey the sub-stream 26a and the other sub-stream 28a out of the power tool 10a, or the housing unit 14a, through differently realized and/or spaced outlet openings 42a, 44a, 46a of the fluid cooling unit 30a. The conveying unit 90a is designed to convey the sub-stream 26a through the outlet openings 42a, 44a, 46a. The conveying unit 90a is designed to convey the other sub-stream 28a through the outlet openings 42a, 44a, 46a.

The fluid cooling unit 30a comprises a main channel element 98a, for conducting the fluid stream 24a, which is arranged in front of the drive unit 16a, as viewed from the intake opening 34a, in particular as viewed along the direction of main extent 54a of the fluid cooling unit 30a. The fluid cooling unit 30a comprises, along the direction of main extent 54a of the fluid cooling unit 30a, in a region of the main channel element 98a, only exactly one guide section 58a that is arranged in particular within the main channel element 98a. The guide section 58a extends from the intake opening 34a through the fluid cooling unit 30a to the outlet openings 42a, 44a, 46a. The direction of main extent 54a of the fluid cooling unit 30a is oriented at least substantially parallel to a direction of main extent 102a of the drive unit 16a and/or of the housing unit 14a and to the drive axis 96a of the conveying element 92a. The main channel element 98a extends from the intake opening 34a, in particular along the direction of main extent of the fluid cooling unit 30a, to the separating unit 22a. The main channel element 98a is connected to the fluid cooling element 66a so as to constitute a single piece. The main channel element 98a, the fluid cooling element 66a and the channel element 56a of the fluid cooling unit 30a each have at least substantially smooth inner walls 104a, which in particular delimit the fluid channels 72a guiding the fluid stream 24a. Preferably, the main channel element 98a, the fluid cooling element 66a and the channel element 56a of the fluid cooling unit 30a, in particular the inner walls 104a of the main channel element 98a, of the fluid cooling element 66a and of the channel element 56a of the fluid cooling unit 30a, are realized without edges, in particular the inner walls 104a of the main channel element 98a, of the fluid cooling element 66a and of the channel element 56a of the fluid cooling unit 30a merging continuously into one another along a guide direction 106a of the fluid stream 24a.

In addition, it is conceivable for the power tool 10a to comprise a sensor unit 108a, which is merely indicated in the figures. The sensor unit 108a comprises at least one sensor element 110a for sensing a temperature of the drive unit 16a. Preferably, the electronic unit 18a is designed to control by open-loop and/or closed-loop control, preferably to limit, a performance characteristic, for example a maximum rotational speed, of the drive unit 16a in dependence on the sensed temperature in order to avoid overheating of the drive unit 16a, or a failure of the power tool 10a. It is also conceivable for the electronic unit 18a to be designed to issue a warning to a user, for example via an optical, acoustic and/or haptic signal, in dependence on the sensed temperature, in particular if a limit value of the temperature is exceeded.

Figure 2:
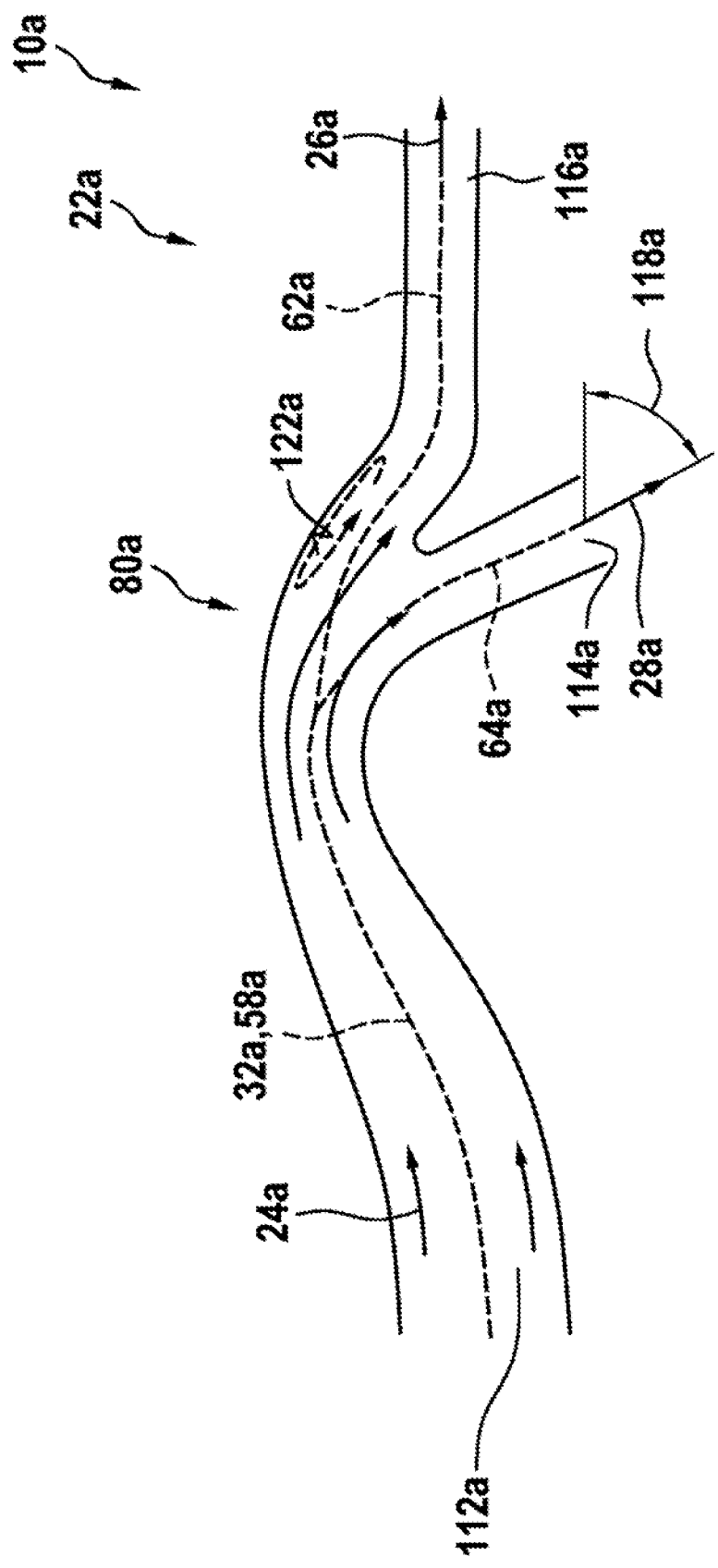
FIG. 2 shows a schematic representation of a separating unit of the power tool according to the disclosure.

FIG. 2 shows a detail view of the separating element 80a on one side of the longitudinal axis 12a of the power tool 10a. The separating unit 22a is realized in such a manner that a value of the foreign body density of the sub-stream 26a is greater than a value of the foreign body density of the other sub-stream 28a, in particular by at least 50%, preferably at least 70%, more preferably at least 80% and particularly preferably at least 90%, in particular the foreign bodies having a size, in particular a mean diameter, of at least 500 μm, preferably at least 100 μm and particularly preferably at least 20 μm. The separating unit 22a is designed to divide the fluid stream 24a into the sub-stream 26a and the other sub-stream 28a by a geometric configuration of the guide section 58a of the, in particular drawn-in, fluid stream 24a, in particular the sub-stream 26a having a higher foreign body density in comparison with the other sub-stream 28a. The separating unit 22a is designed to conduct the sub-stream 26a and the other sub-stream 28a, in particular from the guide section 58a to the various guide sub-sections 62a, 64a.

The separating element 80a realizes a fluid inlet 112a for conducting the fluid stream 24a, and two fluid outlets 114a, 116a for conducting the sub-stream 26a and the other sub-stream 28a, respectively. The separating element 80a has an at least partially curved basic shape in a sectional plane that comprises the guide section 58a and/or at least one of the guide sub-sections 62a, 64a and that corresponds in particular to an image plane of FIG. 2. The separating element 80a is realized in such a manner that the guide section 58a, in a region of the fluid inlet 114a, has an angle 118a of in particular at least 30°, preferably at least 60° and particularly preferably at least 80° to the guide sub-section 64a of the other sub-stream 28a in a region of the fluid outlet 114a. The separating element 80a has a basic shape realized in such a manner that foreign bodies are conducted onto a path that deviates from the guide section 58a of the fluid stream 24a, in particular the guide sub-section 64a of the other sub-stream 28a, in particular onto the guide sub-section 62a of the sub-stream 26a. The separating element 80a is realized in such a manner that the sub-stream 26a is guided at least partially separately from the other sub-stream 28a. The separating element 80a is arranged on the fluid cooling unit 30a, or is realized as part of the fluid cooling unit 30a. The separating element 80a constitutes a single piece with the fluid cooling unit 30a, in particular at least one channel element 56a of the fluid cooling unit 30a, which, however, is not shown in FIG. 2. The separating unit 22a, in particular the separating element 80a, is realized fluidically between the intake opening 34a and the drive unit 16a.

Foreign bodies within the fluid stream 24a, when flowing through the separating element 80a in a flow direction along the guide section 58a, are moved by their inertia along a path that depends on a mass of the foreign bodies. Preferably, foreign bodies that have a larger mass fly on a less curved path than foreign bodies that have a smaller mass. As they flow through the separating element 80a, foreign bodies that have a large mass are conducted to a fluid outlet 116a of the fluid outlets 114a, 116a that is designed to conduct the sub-stream 26a. Another fluid outlet 114a of the fluid outlets 112a, 114a is designed to conduct the other sub-stream 28a. Preferably, the guide section 58a in the region of the fluid inlet 112a has a smaller angle to the guide sub-section 62a of the sub-stream 26a in the region of the fluid outlet 116a than to the guide sub-section 64a of the other sub-stream 28a in the region of the other fluid outlet 114a. Preferably, the separating element 80a is realized in such a manner that a turbulence of the fluid, or fluid stream, is realized on an inner wall 122a of the separating element 80a that delimits the guide sub-section 62a of the sub-stream 26a.

Figure 3:
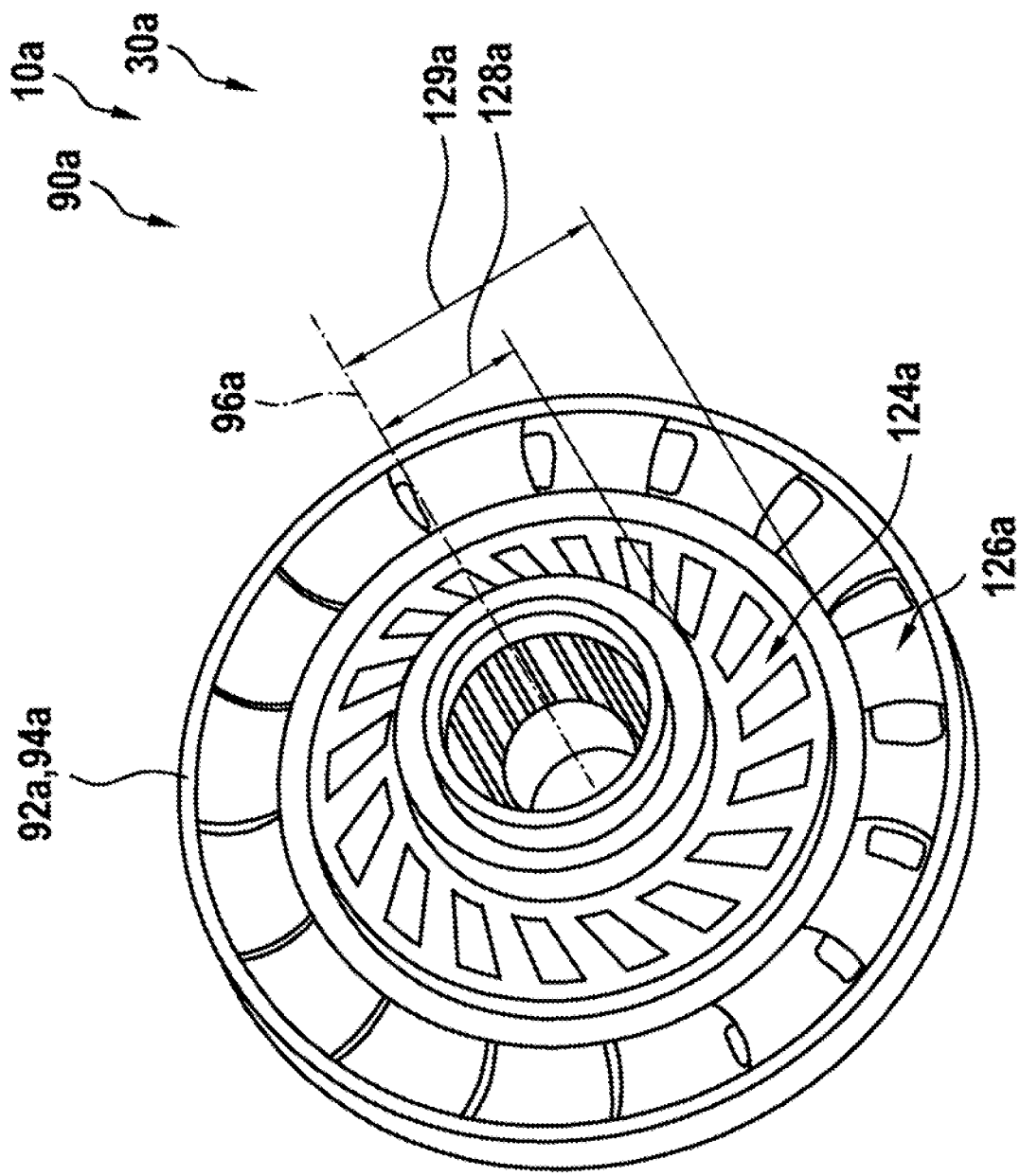
FIG. 3 shows a perspective view of a conveying element of a conveying unit of the power tool according to the disclosure, for conveying a fluid.

FIG. 3 shows a perspective view of the conveying element 92a. The conveying element 92a of the conveying unit 90a is realized as a radial fan in at least one region 124a of the conveying element 92a. The conveying element 92a is realized as an axial fan in at least one further region 126a of the conveying element 92a. The region 124a of the conveying element 92a is surrounded by the further region 126a, as viewed along the drive axis 96a of the conveying element 92a. The region 124a of the conveying element 92a is at a lesser minimum radial distance 128a from the drive axis 96a of the conveying element 92a than the further region 126a of the conveying element 92a (cf. distance 129a). The conveying element 92a is realized as a two-part fan wheel. The region 124a of the conveying element 92a is designed to convey the other sub-stream 28a through the drive unit 16a. The further region 126a of the conveying element 92a is designed to convey the sub-stream 26a through the channel element 56a, or along the outer wall 74a of the drive unit 16a.

Figure 4:
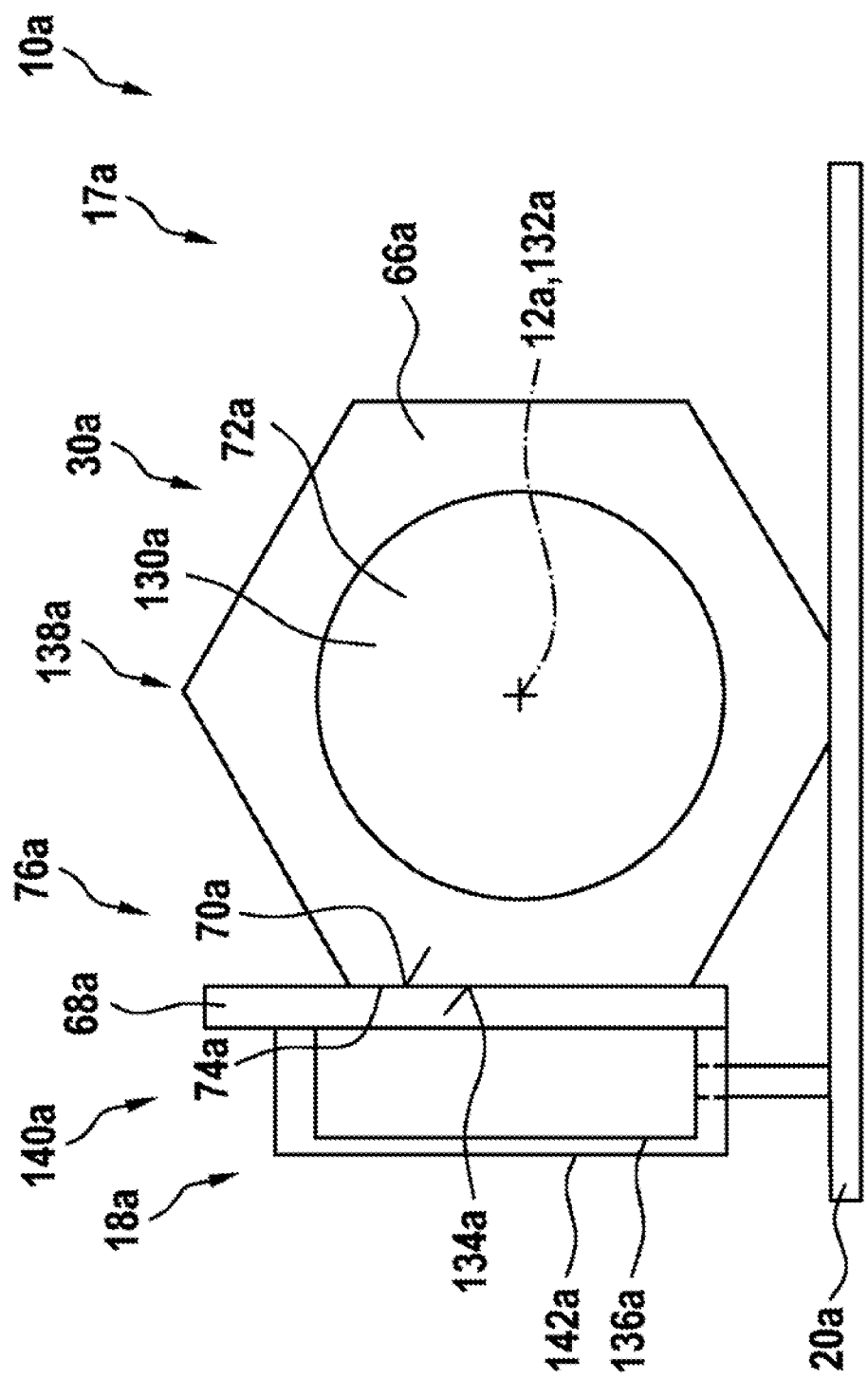
FIG. 4 shows a schematic representation of a cross-section of the electronic unit with a round fluid channel.

FIG. 4 shows a schematic cross-section of the electronic device 17a in the proximity 76a of the electronic unit 18a. The electronic unit 18a is arranged directly on the fluid cooling element 66a. The electronic unit 18a bears at least partially against the outer wall 74a of the fluid cooling element 66a. The fluid cooling element 66a delimits the fluid channel 72a, for conducting the fluid, that has an at least substantially circular cross-sectional area 130a. The cross-sectional area 130a of the fluid channel 72a is oriented at least substantially perpendicularly to a central axis 132a of the fluid cooling element 66a. The cross-sectional area 130a of the fluid channel 72a is oriented at least substantially perpendicularly to the support surface 70a and/or the outer wall 74a of the fluid cooling element 66a. The cross-sectional area 130a of the fluid channel 72a has a contour that is at least substantially circular. Preferably, a maximum value of the cross-sectional area 130a of the fluid channel 72a delimited by the fluid cooling element 66a is at least 100 mm$^2$, preferably at least 200 mm$^2$, more preferably at least 400 mm$^2$, and particularly preferably at least 600 mm$^2$. The fluid cooling element 66a has, on the outer wall 74a of the fluid cooling element 66a, at least one contact surface 134a that at least substantially corresponds to the support surface 70a of the electronic unit 18a, the electronic unit 18a bearing against the contact surface 134a of the fluid cooling element 66a via the support surface 70a. The contact surface 134a and the support surface 70a are realized as flat surfaces. It is also conceivable, however, for the contact surface 134a and the support surface 70a to be realized as at least partially curved surfaces. The electronic unit 18a, in particular an electronic component 136a of the electronic unit 18a, is attached, for example glued and/or screwed, to the fluid cooling element 66a, in particular the contact surface 134a, via the support surface 70a. The contact surface 134a and the support surface 70a have a maximum area of at least 100 mm$^2$, preferably at least 200 mm$^2$, more preferably at least 400 mm$^2$, and particularly preferably at least 600 mm$^2$. Preferably, the contact surface 134a and/or the support surface 70a have/has a maximum area of at most 5000 mm$^2$, preferably at most 3000 mm$^2$ and particularly preferably at most 2000 mm$^2$. The support surface 70a is arranged entirely on the heat diffusion element 68a. The fluid cooling element 66a has a hexagonal basic shape 138a, the contact surface 134a being realized as one side of the basic shape 138a. The heat diffusion element 68a is arranged on the electronic component 136a of the electronic unit 18a and is designed to dissipate heat generated by the electronic component 136a to the fluid cooling element 66a. The electronic component 136a is realized as a power semiconductor such as, for example an IGBT or a MOSFET. It is also alternatively or additionally conceivable for there to be a processor unit, a memory unit or the like arranged on the heat diffusion element 68a for the purpose of cooling. The electronic component 136a is attached to the printed circuit board 20a of the electronic unit 18a. Other designs of the electronic unit 18a, in particular of the heat diffusion element 68a, are also conceivable.

The electronic device 17a comprises a sealing unit 140a, which is designed to close the electronic unit 18a, together with the fluid cooling unit 30a, at least partially, in particular with respect to the fluid flow path 32a, in an at least substantially airtight and/or watertight manner. The sealing unit 140a has a sealing element 142a, which is made of a thermally insulating material, in particular rubber. The sealing element 142a bears at least partially against the heat diffusion element 68a. It is also conceivable for the sealing element 142a to entirely enclose the heat diffusion element 68a, together with the fluid cooling element 66a. Alternatively, it is also conceivable for the sealing element 142a to be made of a thermally conductive material that, in particular, has a thermal conductivity of at least 10 W/(m·K), preferably at least 50 W/(m·K), more preferably at least 100 W/(m·K), particularly preferably at least 200 W/(m·K), and very particularly preferably at least 400 W/(m·K). The sealing element 142a encloses the electronic component 136a of the electronic unit 18a, together with the fluid cooling element 66a and the heat diffusion element 68a, at least substantially entirely. It is conceivable for a volume enclosed between the sealing element 142a and the electronic unit 18a, or the fluid cooling element 66a and/or the heat diffusion element 68a, to be filled with or evacuated by a thermally insulating gas. In particular, the evacuated volume has a maximum pressure of in particular less than 1000 mbar, preferably less than 300 mbar, more preferably less than 1 mbar, and particularly preferably less than $10^{-2}$ mbar.

Figure 5:
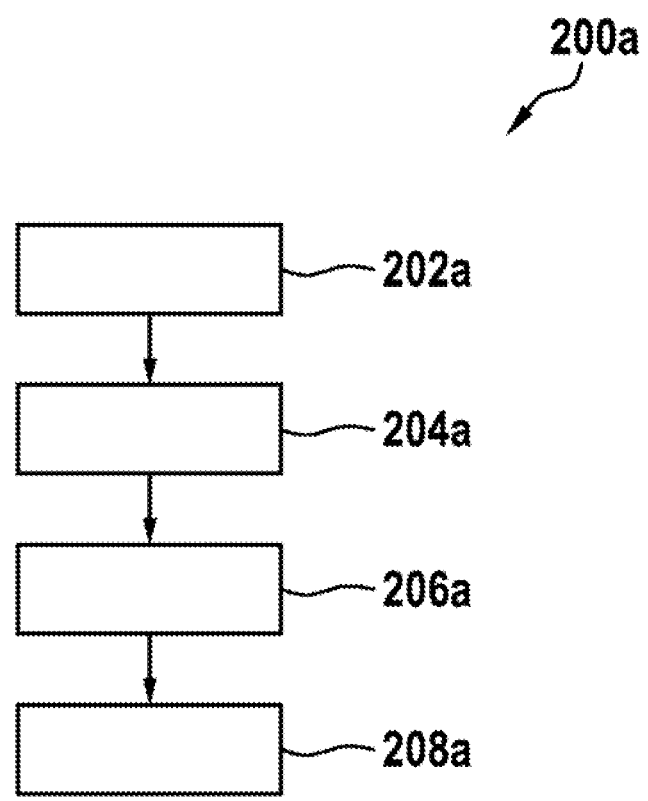
FIG. 5 shows a schematic representation of an exemplary sequence of a method according to the disclosure for cooling a drive unit of the power tool according to the disclosure.

FIG. 5 shows an exemplary sequence of a process 200a for cooling the drive unit 16a, or the electronic unit 18a, of the power tool 10a. In a process step 202a of the process 200a, the fluid stream 24a is drawn through the intake opening 34a by means of the conveying unit 90a. In a further process step 204a of the process 200a, the fluid stream 24a flowing through the main channel element 98a is used to cool the electronic unit 18a via the fluid cooling element 66a. When flowing through the main channel element 98a, the fluid stream 24a flows through the fluid cooling element 66a, with heat being dissipated from the electronic unit 18a, via the fluid cooling element 66a, to the fluid stream 24a for the purpose of cooling the electronic unit 18a. In a further process step 206a of the process 200a, the separating unit 22a, in particular the separating element 80a, divides the fluid stream 24a into the sub-stream 26a, in particular the one loaded with foreign bodies, and the other sub-stream 28a, in particular the one containing few foreign bodies. The sub-stream 26a is guided by means of the separating unit 22a and the fluid cooling unit 30a, through the channel element 56a, along the outer wall 84a of the drive unit 16a, the drive unit 16a being cooled via the sub-stream 26a, in particular heat being transferred from the outer wall 84a of the drive unit 16a to the sub-stream 26a. The other sub-stream 28a is conducted into, or through, the drive unit 16a by means of the separating unit 22a and the fluid cooling unit 30a, the drive unit 16a, in particular windings of the drive unit 16a, being cooled by means of the other sub-stream 28a, in particular heat being transferred from the drive unit 16a to the other sub-stream 28a. In a further process step 208a of the process 200a, the other sub-stream 28a is conveyed via the region 124a of the conveying element 92a in a direction toward the working region 38a, or the outlet opening 46a, and is conveyed out of the power tool 10a, in particular out of the housing unit 14a and/or the fluid cooling unit 30a, through the outlet opening 46a. In a process step of the process 200a, in particular the process step 208a, the sub-stream 26a is conveyed via the further region 126a of the conveying element 92a in directions oriented at least substantially parallel to the drive axis 96a of the conveying element 92a, and is conducted via the fluid cooling unit 30a to the outlet openings 42a, 44a, or out of the power tool 10a, in particular out of the housing unit 14a and/or the fluid cooling unit 30a.

FIGS. 6 to 11 show a further exemplary embodiments of the disclosure. The following descriptions and the drawings are limited substantially to the differences between the exemplary embodiments and, in principle, reference may also be made to the drawings and/or the description of the other exemplary embodiments, in particular of FIGS. 1 to 5, in respect of components having the same designation, in particular in respect of components denoted by the same references. To distinguish the exemplary embodiments, the letter a has been appended to the references of the exemplary embodiment in FIGS. 1 to 5. In the exemplary embodiments of FIGS. 6 to 11, the letter a is replaced by the letters b to g.

Figure 6:
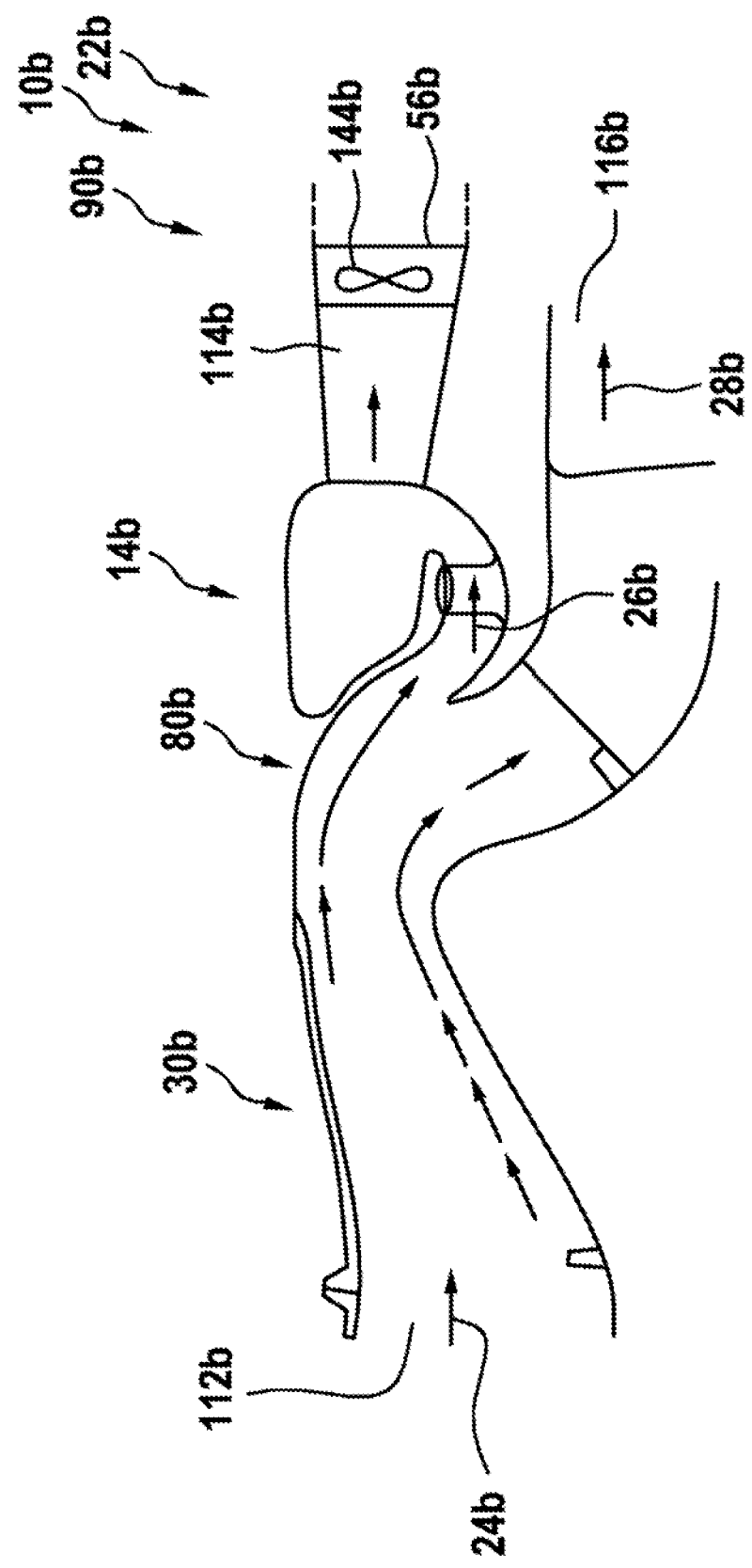
FIG. 6 shows a schematic representation of an alternative design of a separating unit of a power tool according to the disclosure.

FIG. 6 shows an alternative design of a separating unit 22b, in particular a separating element 80b, or a conveying unit 90b of a power tool 10b. The power tool 10b has a housing unit 14b, a drive unit 16b, arranged within the housing unit 14b, that in particular is not shown in FIG. 6, and the separating unit 22b, the separating unit 22b being designed to divide at least one fluid stream 24b conducted through the housing unit 14b, in particular in dependence on a foreign body density, into at least two sub-streams 26b, 28b, one sub-stream 26b of the sub-streams 26b, 28b having a higher foreign body density in comparison with another sub-stream 28b of the sub-streams 26b, 28b. The power tool 10b has a fluid cooling unit 30b, which is designed to cool the drive unit 16b by means of the at least two sub-streams 26b, 28b. The power tool 10b represented in FIG. 6 is at least substantially similar in design to the power tool 10a described in the description of FIGS. 1 to 5, such that reference may be made at least substantially to the description of FIGS. 1 to 5 in respect of a design of the power tool 10b represented in FIG. 6. In contrast to the power tool 10a described in FIGS. 1 to 5, the separating unit 22b and/or the conveying unit 90b of the power tool 10b represented in FIG. 6 preferably has a further conveying element 144b. The further conveying element 144b is arranged at a fluid outlet 114b of the separating element 80b that is designed to conduct the fluid stream 24b. The further conveying element 144b is realized as a fan. The further conveying element 144b is designed to convey the sub-stream 26b into a channel element 56b of the fluid cooling unit 30b that is arranged along an outer wall 84b of the drive unit 16b that, in particular, is not shown in FIG. 6 and that is designed to cool the drive unit 16b via the sub-stream 26b. The further conveying element 144b is designed to draw foreign bodies in the fluid stream 24b into the sub-stream 26b, in particular with a foreign body density of the sub-stream 26b being increased and a foreign body density of the other sub-stream 28b being reduced. The further conveying element 144b is arranged, in particular fluidically, between the intake opening 34b of the fluid cooling unit 30b and the drive unit 16b. The further conveying element 144b is arranged at least largely within the fluid cooling unit 30b, in particular the channel element 56b. The further conveying element 144b is arranged, in particular fluidically, between the separating unit 22b and the drive unit 22b, or outlet openings 42b, 44b, 46b, of the fluid cooling unit 30b. It is also conceivable for the further conveying element 144b to be arranged between an intake opening 36b of the fluid cooling unit 30b and the separating element 80b. The further conveying element 144b is designed to convey the sub-stream 26b and/or the other sub-stream 28b through the fluid cooling unit 30b, through the separating unit 22b and/or out of the power tool 10b, or out of the housing unit 14b. After flowing through, or past, the drive unit 16b, the sub-stream 26b and the other sub-stream 28b are guided together out of the power tool 10b through a plurality of outlet openings 42b, 44b, 46b. In particular, after flowing through, or past, the drive unit 16b, the sub-stream 26b and the other sub-stream 28b within the power tool 10b, in particular the housing unit 14b, are brought together in a channel element of the fluid cooling unit 30b. It is also conceivable, however, for the fluid cooling unit 30b to be realized in such a manner that the sub-stream 26b and the other sub-stream 28b are guided separately out of the power tool 10b.

Figure 7:
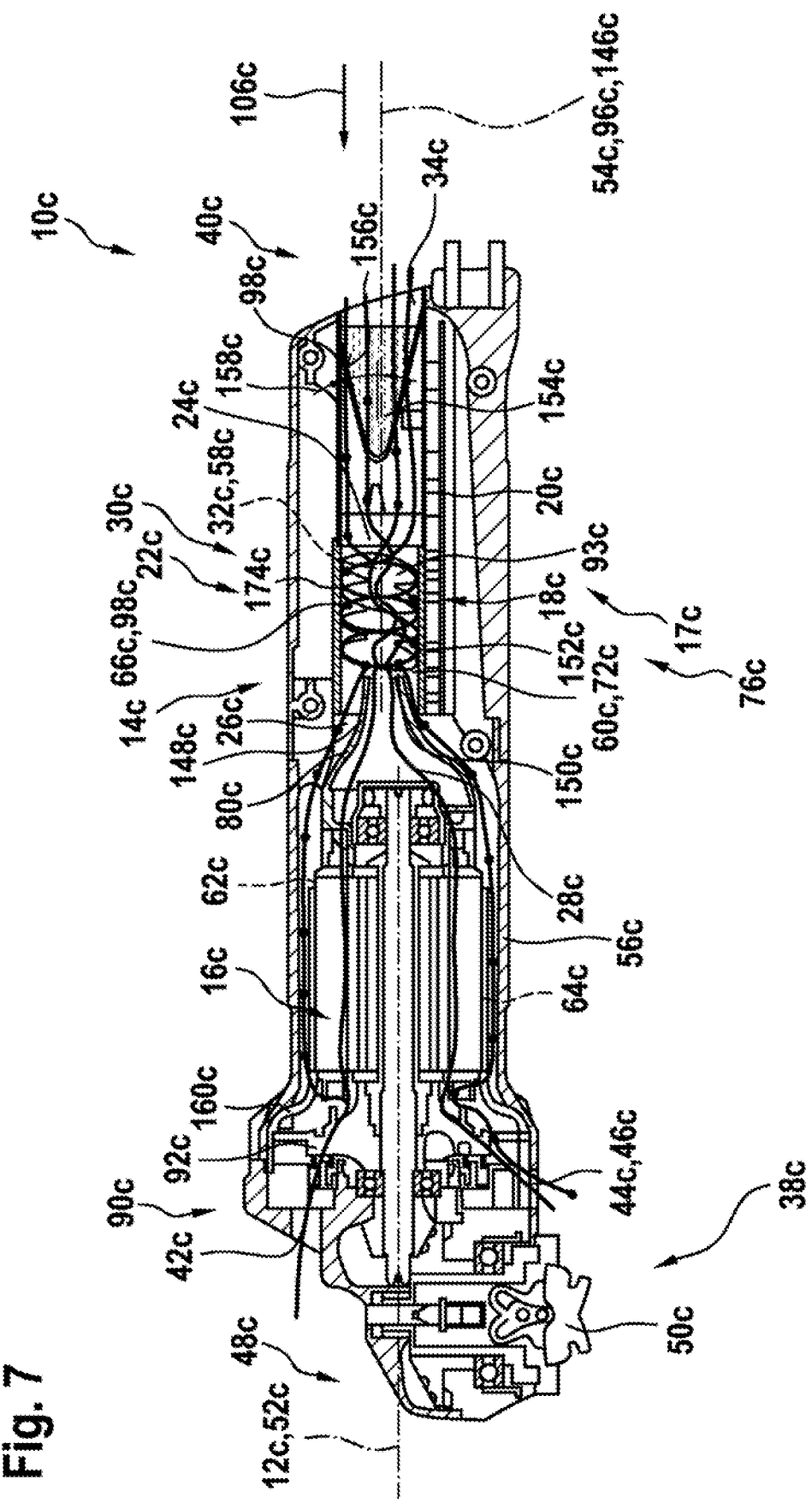
FIG. 7 shows a side view of a longitudinal section of an alternative design of a power tool according to the disclosure with an electronic device and a helical separating element of a separating unit of the power tool.

FIG. 7 shows an alternative design of a power tool 10c, in particular in a representation similar to FIG. 1. The power tool 10c has an electronic device 17c, a housing unit 14c, a drive unit 16c arranged within the housing unit 14c, and a separating unit 22c, the separating unit 22c being designed to divide at least one fluid stream 24c conducted through the housing unit 14c into at least two sub-streams 26c, 28c, in particular in dependence on a foreign body density, into at least two sub-streams 26c, 28c, one sub-stream 26c of the sub-streams 26c, 28c having a higher foreign body density in comparison with another sub-stream 28c of the sub-streams 26c, 28c. The power tool 10c and/or the electronic device 17c, has/have a fluid cooling unit 30c, which is designed to cool the drive unit 16c by means of the at least two sub-streams 26c, 28c. The power tool 10c and/or the electronic device 17c comprise/comprises an electronic unit 18c, the fluid cooling unit 30c being designed to cool the electronic unit 18c by means of a fluid, or the fluid stream 24c. The electronic unit 18c is arranged at least largely, in particular entirely, outside of a fluid flow path 32c of the fluid cooling unit 30c. The power tool 10c, in particular the separating unit 22c, has a conveying unit 90c for conveying the fluid through the fluid cooling unit 30c. The power tool 10c represented in FIG. 7 is at least substantially similar in design to the power tool 10a described in the description of FIGS. 1 to 5, such that reference may be made at least substantially to the description of FIGS. 1 to 5 in respect of a design of the power tool 10c represented in FIG. 7. In contrast to the power tool 10a described in the description of FIGS. 1 to 5, the separating unit 22c of the power tool 10c represented in FIG. 7 preferably has a further separating element 93c that is arranged within a main channel element 98c of the fluid cooling unit 30c and is designed to conduct the fluid stream 24c along a circular path 174c for the purpose of dividing the sub-streams 26c, 28c, as viewed along the main channel element 98c. The further separating element 93c is realized as a helical molding. The further separating element 93c delimits, in particular within and/or together with the main channel element 98c, a fluid guiding channel that extends, from the intake opening 34c in the direction of the drive unit 16c, along a curve that runs with a constant gradient around a lateral surface of an imaginary cylinder. In particular, the curve realizes the circular path 174c in a projection plane. The conveying unit 90c of the power tool 10c comprises a conveying element 92c that constitutes a single part with a fan of the drive unit 16c. The conveying element 92c is arranged behind the main channel element 98c, the further separating element 93c and the drive unit 16c, as viewed from an intake opening 34c of the fluid cooling unit 30c. The conveying element 92c is designed to draw the fluid stream 24c through the intake opening 34c into the power tool 10c, in particular the fluid cooling unit 30c. The conveying element 92c is designed to draw the fluid stream 24c through the intake opening 34c into the power tool 10c, in particular the fluid cooling unit 30c. The conveying element 92c is designed to convey the fluid stream 24c through main channel element 98c and a fluid channel delimited by the main channel element 98c and the further separating element 93c and, in particular, to convey the sub-stream 26c through the channel element 56c after the separating unit 22c. A separating element 80c of the separating unit 22c and the fluid cooling unit 30c are realized in such a manner that the sub-stream 26c and the other sub-stream 28c are conducted separately from one another after exiting the further separating element 93c. The separating element 80c is realized as a funnel, in particular the other sub-stream 28c being conducted along a central axis 146c of the separating element 80c that in particular is arranged coaxially with a central axis of the further separating element 93c and of the main channel element 98c, and the sub-stream 28c being guided along an outer wall 148c of the separating element 80c. The separating element 80c is at least partially cone-shaped. The separating element 80c delimits at least one passage 150c, around the central axis 146c, that is designed in particular to conduct the other sub-stream 28c, in particular through, or into, the drive unit 16c. The conveying element 92c is designed to divide the fluid stream 24c, together with a separating element 80c of the separating unit 22c, into the sub-streams 26c, 28c, in particular the sub-stream 26c being at a greater radial distance from the central axis of the further separating element 93c and the main channel element 98c than the other sub-stream 28c. The further separating element 93c is at least largely surrounded by the main channel element 98c, as viewed along its central axis. The further separating element 98c is designed, in particular for the purpose of cooling the electronic unit 18c, to compress the fluid at an inner wall 152c of the fluid cooling element 66c, or of the main channel element 98c, that delimits a fluid channel 72c. The further separating element 98c is designed to increase a flow duration of the fluid, or of the fluid stream 24c, through the fluid cooling element 66c or the main channel element 98c, in particular in comparison with a design in which the fluid cooling element 66c, or the main channel element 98c, is hollow, in particular without the further separating element 93c.

The separating unit 22c and the fluid cooling unit 30c respectively comprise a filter element 154c that is designed to alter, in particular to reduce, the foreign body density of the fluid stream 24c. The filter element 154c is arranged, in particular directly, at the intake opening 34c of the fluid cooling unit 30c. The filter element 154c, in particular a filter surface 156c of the filter element 154c, is arranged at least partially transversely to a direction of main extent 54c of the fluid cooling unit 30c. The filter surface 156c spans, with the direction of main extent 54c of the fluid cooling unit 30c, in a region of the filter element 154c, or of the intake opening 34c, an angle 158c having a value from a value range of, in particular, 8° to 82°, preferably 10° to 50° and particularly preferably 15° to 30°. The angle 158c spanned by the filter surface 156c and the direction of main extent 54c of the fluid cooling unit 30c is preferably at least substantially 18°. The filter element 154c is at least largely cone-shaped. Preferably, a low flow resistance of the filter element 154c in the fluid stream 24c can be achieved by the design of the filter element 154c. After flowing past the drive unit 16c, the fluid stream 24c is conveyed out of the power tool 10c, via a plurality of outlet openings 42c, 44c, 46c by means of the conveying element 92c. Alternatively, it is conceivable for the filter element 154c to be arranged on the separating element 80c and to be designed to filter, in particular to reduce, a foreign body density of the other sub-stream 28c before entry into the drive unit 16c. In particular, the sub-stream 26c and the other sub-stream 28c, after flowing through, or past, the drive unit 16c, are brought together within the power tool 10c, in particular the housing unit 14c, in a further channel element 160c of the fluid cooling unit 30c. It is also conceivable, however, for the fluid cooling unit 30c to be realized in such a manner that the sub-stream 26c and the other sub-stream 28c are conducted separately out of the power tool 10c.

It is conceivable for the conveying unit 90c to have a further conveying element, realized as a spiral wheel that in particular is not shown in FIG. 7, or for the further separating element 93c to be realized so as to be movable by means of a drive element of the drive unit 16c, in particular about its central axis. In particular, the drive element is designed to drive the further separating element 93c and thereby to convey the fluid stream 24c through the fluid cooling unit 30c, in particular the main channel element 98c.

Figure 8:
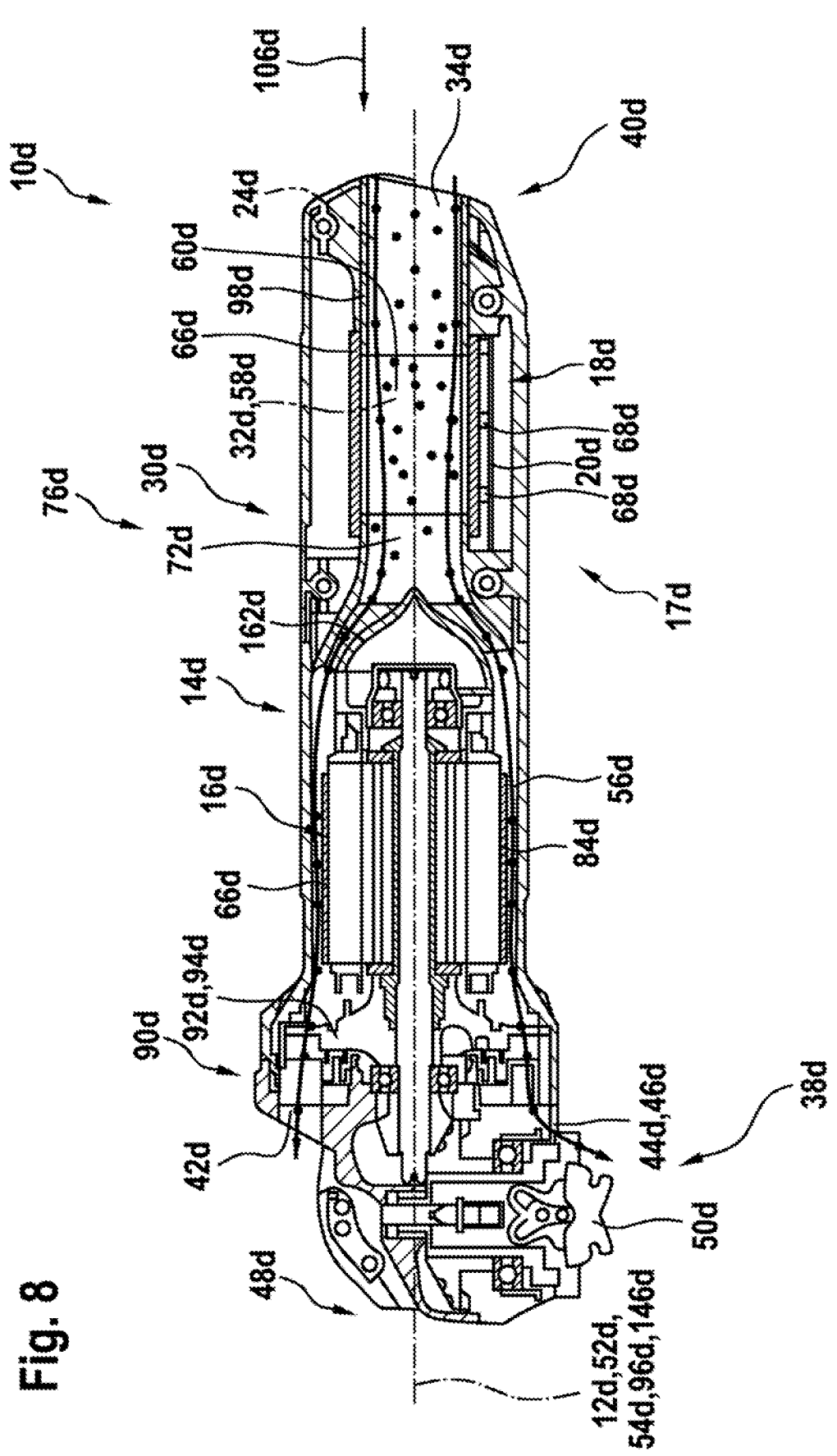
FIG. 8 shows a side view of a longitudinal section of a further alternative design of a power tool according to the disclosure with an electronic device.

FIG. 8 shows an alternative design of a power tool 10d, in particular in a representation similar to FIG. 1. The power tool 10d has an electronic device 17d, a housing unit 14d, and a drive unit 16d arranged within the housing unit 14d. The power tool 10d, or the electronic device 17d, has a fluid cooling unit 30d, which is designed to cool the drive unit 16d by means of the at least two sub-streams 26d, 28d. The power tool 10d, or the electronic device 17d, comprises an electronic unit 18d, the fluid cooling unit 30d being designed to cool the electronic unit 18d by means of a fluid or the fluid stream 24d. The electronic unit 18d is arranged at least largely, in particular entirely, outside of a fluid flow path 32d of the fluid cooling unit 30d. The power tool 10d represented in FIG. 8 is at least substantially similar in design to the power tool 10a described in the description of FIGS. 1 to 5, such that reference may be made to the description of FIGS. 1 to 5 in respect of a design of the power tool 10d represented in FIG. 8. In contrast to the power tool 10a described in FIGS. 1 to 5, the power tool 10d represented in FIG. 8 preferably does not have a separating unit. The fluid cooling unit 30d is designed to cool the electronic unit 18d and the drive unit 16d by means of the drawn-in fluid stream 24d, in particular the drive unit 16d being effected by the fluid stream 24d being guided along an outer wall 84d of the drive unit 16d. The fluid cooling unit 30d comprises a channel element 56d that guides the fluid stream 24d directly along and at least substantially parallel to the outer wall 84d of the drive unit 16d. The fluid stream 24d is conveyed through the power tool 10d via a conveying unit 90d. The conveying unit 90d comprises a conveying element 92d that is arranged, in particular fluidically, behind the drive unit 16d, as viewed from the intake opening 34d. The fluid cooling unit 30d comprises a fluid cooling element 66d that is designed to dissipate heat from the electronic unit 18d to the fluid stream 24d. The fluid cooling element 66d constitutes a single piece with a main channel element 98d of the fluid cooling unit 30d, in particular an entire drawn-in fluid stream 24d in proximity to 76d of the electronic unit 18d running through the main channel element 98d and the fluid cooling element 66d. The fluid cooling unit 30d comprises a deflector element 162d, which is in particular at least substantially conical. The deflector element 162d is streamlined. The deflector element 162d is designed to guide the fluid stream 24d from the main channel element 98d into the channel element 56d, in particular the fluid stream 24d being guided radially outward from a central axis 146d of the main channel element 98d.

Figure 9:
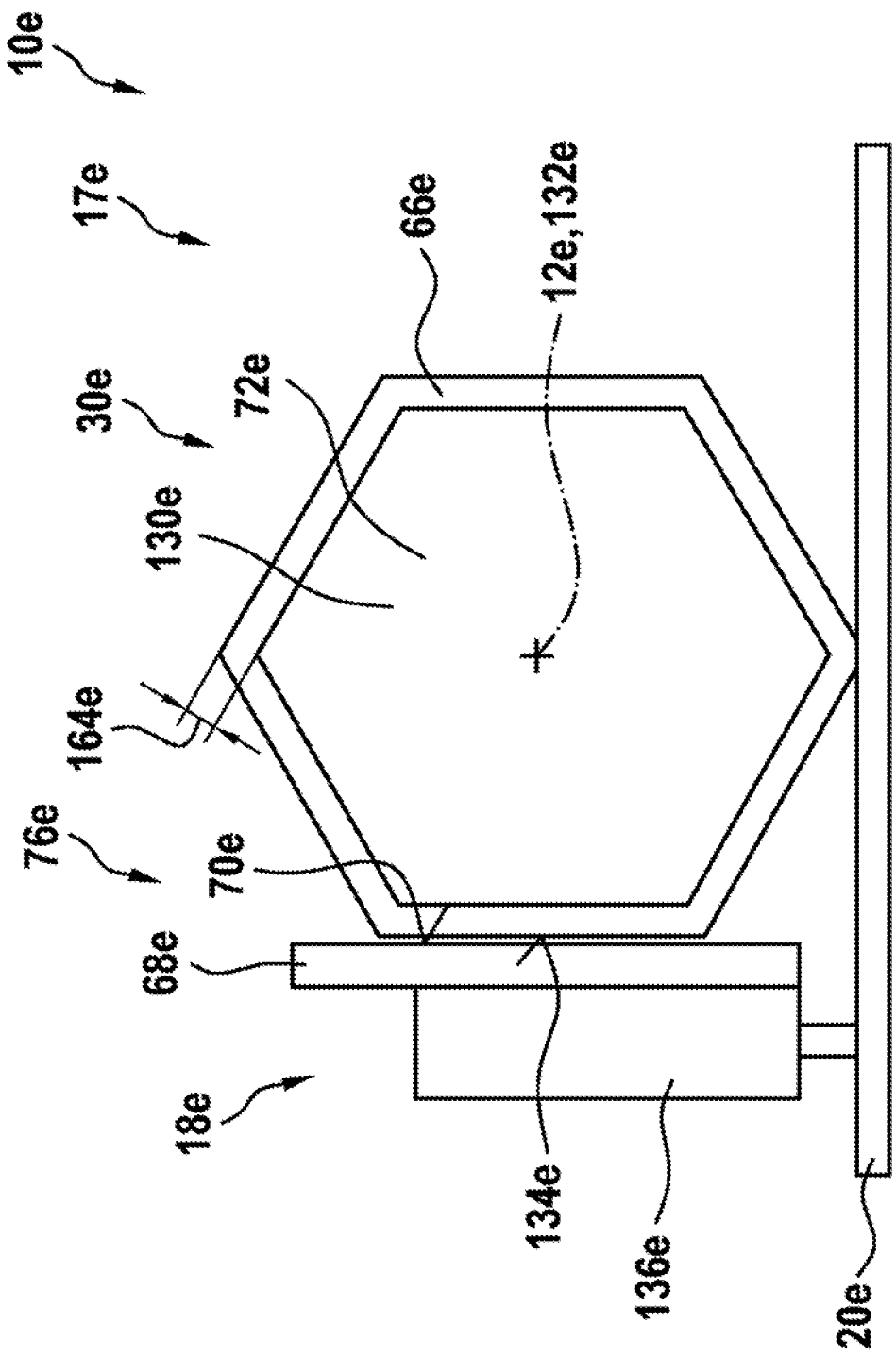
FIG. 9 shows a schematic representation of a cross-section of an alternative design of a fluid cooling element of a fluid cooling unit of a power tool according to the disclosure with an angular fluid channel.

FIG. 9 shows an alternative design of a fluid cooling element 66e of a fluid cooling unit 30e of a power tool 10e or an electronic device 17e. The power tool 10e, or electronic device 17e, represented in FIG. 9 is at least substantially similar in design to the power tool 10a or electronic device 17a described in the description of FIGS. 1 to 5, such that reference may be made at least substantially to the description of FIGS. 1 to 5 in respect of a design of the power tool 10e or electronic device 17e represented in FIG. 9. In contrast to the power tool 10a, or electronic device 17a, described in FIGS. 1 to 5, the fluid cooling element 66e of the fluid cooling unit 30e of the power tool 10e, or electronic device 17e, represented in FIG. 9 preferably delimits a fluid channel 72e that has an angular cross-sectional area 130e. The cross-sectional area 130e of the fluid channel 72e delimited by the fluid cooling element 66e is hexagonal. A minimum wall thickness 164e of the fluid cooling element 66e is in particular at least 0.5 mm, preferably at least 1 mm, more preferably at least 1.5 mm, and particularly preferably at least 2 mm, and/or in particular at most 10 mm, preferably at most 6 mm, and more preferably at most 4 mm. Preferably, a maximum value of the cross-sectional area 130e of the fluid channel 72e delimited by the fluid cooling element 66e is at least 100 mm$^2$, preferably at least 200 mm$^2$, more preferably at least 400 mm$^2$, and more preferably at least 600 mm$^2$. In particular, an electronic unit 18e of the power tool 10e is realized without a sealing unit. However, other designs of the fluid cooling unit 30e and/or the electronic unit 18e are also conceivable.

Figure 10:
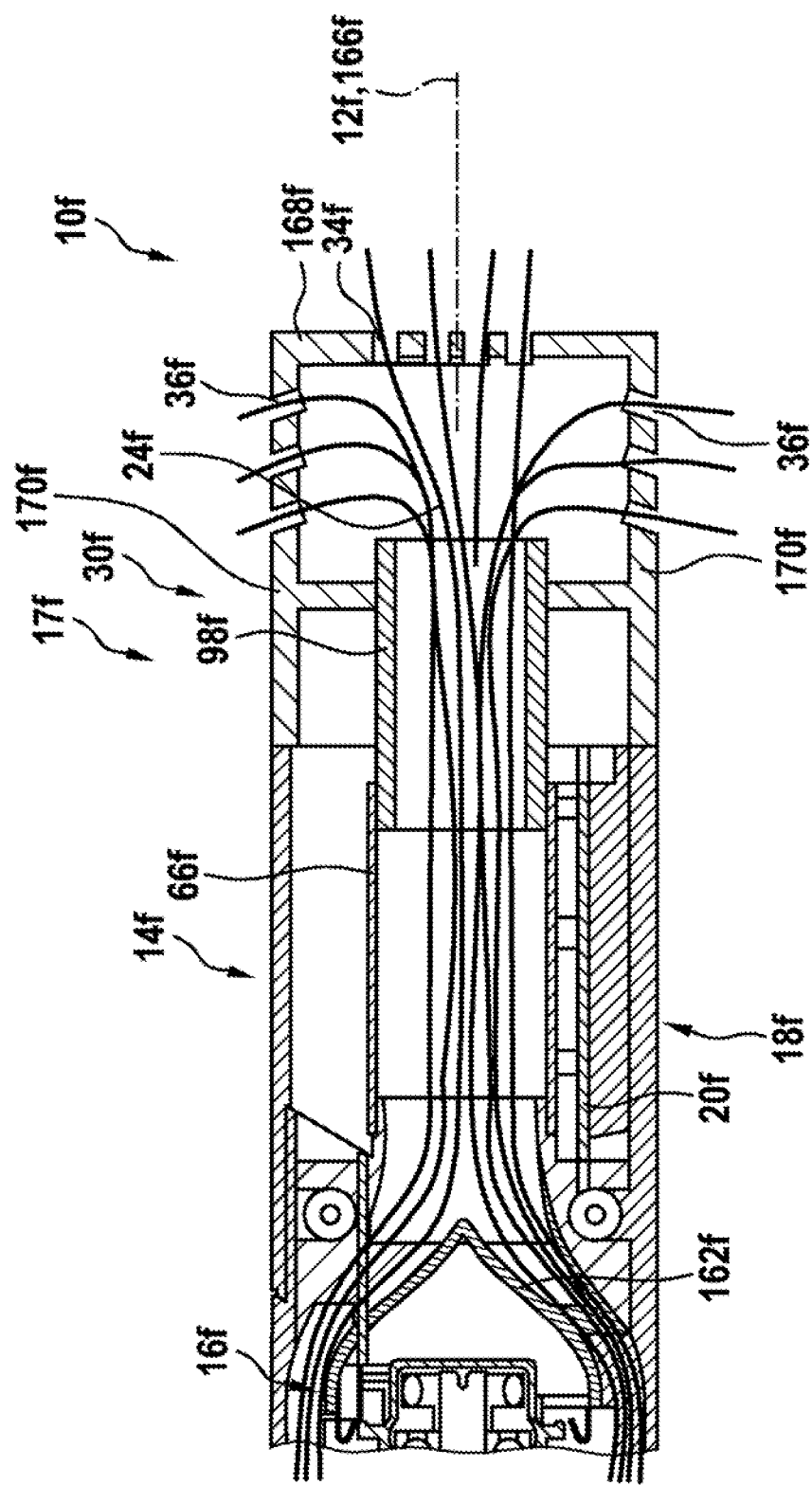
FIG. 10 shows a side view of a longitudinal section of another alternative design of a power tool according to the disclosure with an electronic device and a fluid cooling unit having a plurality of inlet openings.

FIG. 10 shows another alternative design of a power tool 10f, or an electronic device 17f, the power tool 10f being shown in a longitudinal section similar to FIG. 1. The power tool 10f represented in FIG. 10 is at least substantially similar in design to the power tool 10d described in the description of FIG. 8, such that reference may be made at least substantially to the description of FIG. 8 in respect of a design of the power tool 10f represented in FIG. 10. In contrast to the power tool 10d described in the description of FIG. 8, a housing unit 14f of the power tool 10f represented in FIG. 10 delimits more than one intake opening 34f, 36f for drawing in a fluid or a fluid stream 24f for cooling an electronic unit 18f and a drive unit 16f by means of a fluid cooling unit 30f. The intake openings 34f, 36f are designed to guide fluid, or the fluid stream 24f, into a main channel element 98f of the fluid cooling unit 30f. The housing unit 14f and/or the fluid cooling unit 30f delimit/delimits ten intake openings 34f, 36f, four intake openings 34f of the ten intake openings 34f, 36f being arranged on an outer wall 168f of the power tool 10f, in particular of the housing unit 14f, that is oriented at least substantially perpendicularly to a central axis 166f of the main channel element 98f, or to a longitudinal axis 12f of the power tool 10f. Three intake openings 36f of the ten intake openings 34f, 36f are in each case arranged on outer walls 170f of the power tool 10f, in particular of the housing unit 14f, that face away from each other and in particular are oriented at least substantially parallel to the central axis 166f of the main channel element 98f or to the longitudinal axis 12f of the power tool 10f. The ten intake openings 34f, 36f are designed to receive the fluid, or the fluid stream 24f, on a side of the power tool 10f that faces away from a working region 38f of the power tool 10f, and to combine it in the main channel element 98f, in particular before it flows through a fluid cooling element 66f of the fluid cooling unit 30f. However, other designs of the housing unit 14f and/or the fluid cooling unit 30f are also conceivable, in particular with a number of intake openings 34f, 36f other than ten. It is conceivable for there to be a filter element attached to the intake openings 34f, 36f, in particular in each case, in order to reduce a foreign body density of the drawn-in fluid stream 24f.

Figure 11:
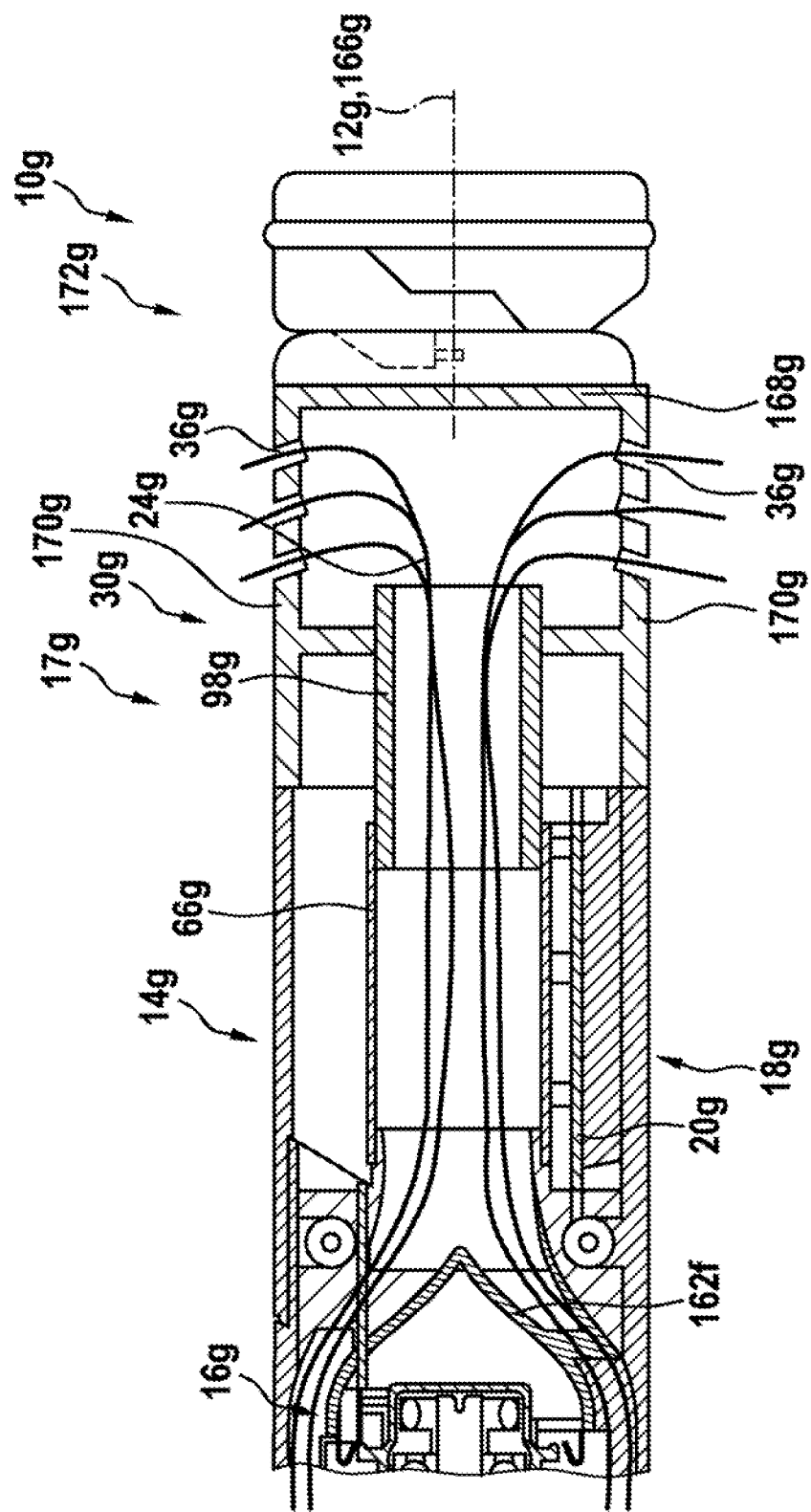
FIG. 11 shows a side view of a longitudinal section of a further, other alternative design of a power tool according to the disclosure with an electronic device and a fluid cooling unit having a plurality of lateral inlet openings.

FIG. 11 shows another alternative design of a power tool log and of an electronic device 17g, the power tool log being shown in a longitudinal section similar to FIG. 1. The power tool log represented in FIG. 11 is at least substantially similar in design to the power tool 10d described in the description of FIG. 8, such that reference may be made at least substantially to the description of FIG. 8 in respect of a design of the power tool log represented in FIG. 1. In contrast to the power tool 10d described in the description of FIG. 8, a housing unit 14g of the power tool log represented in FIG. 11 delimits more than one intake opening 36g for drawing in a fluid, or a fluid stream 24g, for cooling an electronic unit 18g and a drive unit 16g by means of a fluid cooling unit 30g. The intake openings 36g are designed to guide fluid, or the fluid stream 24g, into a main channel element 98g of the fluid cooling unit 30g. The housing unit 14g and/or the fluid cooling unit 30g delimit/delimits six intake openings 36g, three intake openings 36g of the six intake openings 36g being arranged on outer walls 170g of the power tool 10g, in particular of the housing unit 14g, that face away from each other and in particular are oriented at least substantially parallel to a central axis 166g of the main channel element 98g, or to a longitudinal axis 12g of the power tool 10g. The six intake openings 36g are designed to receive the fluid, or the fluid stream 24g, on a side of the power tool log that faces away from a working region 38g of the power tool 10g, and to combine it in the main channel element 98g, in particular before it flows through a fluid cooling element 66g of the fluid cooling unit 30g. The power tool log is realized as a battery-operated power tool. There is a battery pack 172g attached to an outer wall 168g of the power tool 10g, in particular of the housing unit 14g, that is oriented at least substantially perpendicularly to the central axis 166g of the main channel element 98g, or to the longitudinal axis 12g of the power tool 10g. The intake openings 36g face away from the battery pack 172g. However, other designs of the housing unit 14g and/or the fluid cooling unit 30g are also conceivable, in particular with a number of intake openings 36g other than six.

The invention claimed is:

1. A power tool comprising:
   at least one electronic device including
      at least one electronic unit, and
      at least one fluid cooling unit configured to cool the at least one electronic unit using a fluid,
   wherein the at least one electronic unit is arranged entirely outside of a fluid flow path of the at least one fluid cooling unit,
   wherein the at least one fluid cooling unit comprises at least one fluid cooling element against which the at least one electronic unit at least partially bears,
   wherein the at least one fluid cooling element is realized as a channel element configured to conduct the fluid and that surrounds the fluid flow path of the at least one fluid cooling unit, and
   wherein the at least one fluid cooling unit is configured such that the fluid flow path extends longitudinally through the channel element.

2. The power tool as claimed in claim 1, wherein the at least one electronic unit bears at least partially against an outer wall of the at least one fluid cooling element.

3. The power tool as claimed in claim 2, wherein the channel element has a substantially round cross-sectional area defined oriented at least substantially perpendicularly to a central axis and/or a direction of main extent of the at least one fluid cooling element, and the at least one fluid cooling element is configured such that the fluid flow path extends along the central axis of the at least one fluid cooling element.

4. The power tool as claimed in claim 2, wherein:
   the at least one fluid cooling element has, on the outer wall, at least one contact surface that at least substantially corresponds to a support surface; and
   the at least one electronic unit bears against the at least one contact surface of the at least one fluid cooling element via the support surface.

5. The power tool as claimed in claim 1, wherein the at least one fluid cooling element is, at least in a region against which the at least one electronic unit bears, made of a material having a thermal conductivity of at least 10 W/(m·K).

6. The power tool as claimed in claim 1, wherein the fluid flow path, at least in proximity to the at least one electronic unit, extends at least substantially entirely within the at least one fluid cooling element.

7. The power tool as claimed in claim 1, further comprising:
   at least one sealing unit designed to close the at least one electronic unit, together with the at least one fluid cooling unit, at least partially, with respect to the fluid flow path, at least substantially in an airtight and/or watertight manner.

8. The power tool as claimed in claim 2, further comprising:
   at least one drive unit, wherein the at least one fluid cooling unit is designed to cool the at least one drive unit.

9. The power tool as claimed in claim 8, further comprising:
   a housing,
   wherein the channel element is arranged at least substantially entirely within the housing.

10. The power tool as claimed in claim 9, wherein the at least one drive unit is enclosed in the housing.

11. The power tool as claimed in claim 10, wherein the at least one drive unit defines a drive axis that is coaxial with a direction of main extent of the at least one fluid cooling unit.

12. The power tool as claimed in claim 8, further comprising:
   a tool holder configured to be driven by the at least one drive unit.

13. The power tool as claimed in claim 12, further comprising;
   a separating unit configured to divide a fluid stream in the fluid flow path into at least two sub-streams such that a first sub-stream of the at least two sub-streams has a higher density of foreign bodies in the fluid stream than a second sub-stream of the at least two sub-streams,
   wherein the separating unit is arranged fluidically downstream of the at least one electronic unit and upstream of the at least one drive unit.

14. The power tool as claimed in claim 13, wherein the at least one fluid cooling unit includes at least one outlet opening arranged at a first end region of the power tool that includes the tool holder.

15. The power tool as claimed in claim 14, wherein the at least one fluid cooling unit includes at least one inlet opening arranged at a second end region of the power tool opposite the first end region.

16. The power tool as claimed in claim 1, wherein the power tool is a hand-held power tool.

* * * * *